May 18, 1937.  W. H. ROBERTSON  2,080,507
CASH REGISTER
Filed Oct. 27, 1933   17 Sheets-Sheet 1

Inventor
William H. Robertson
By
Kearl Benst
His Attorney

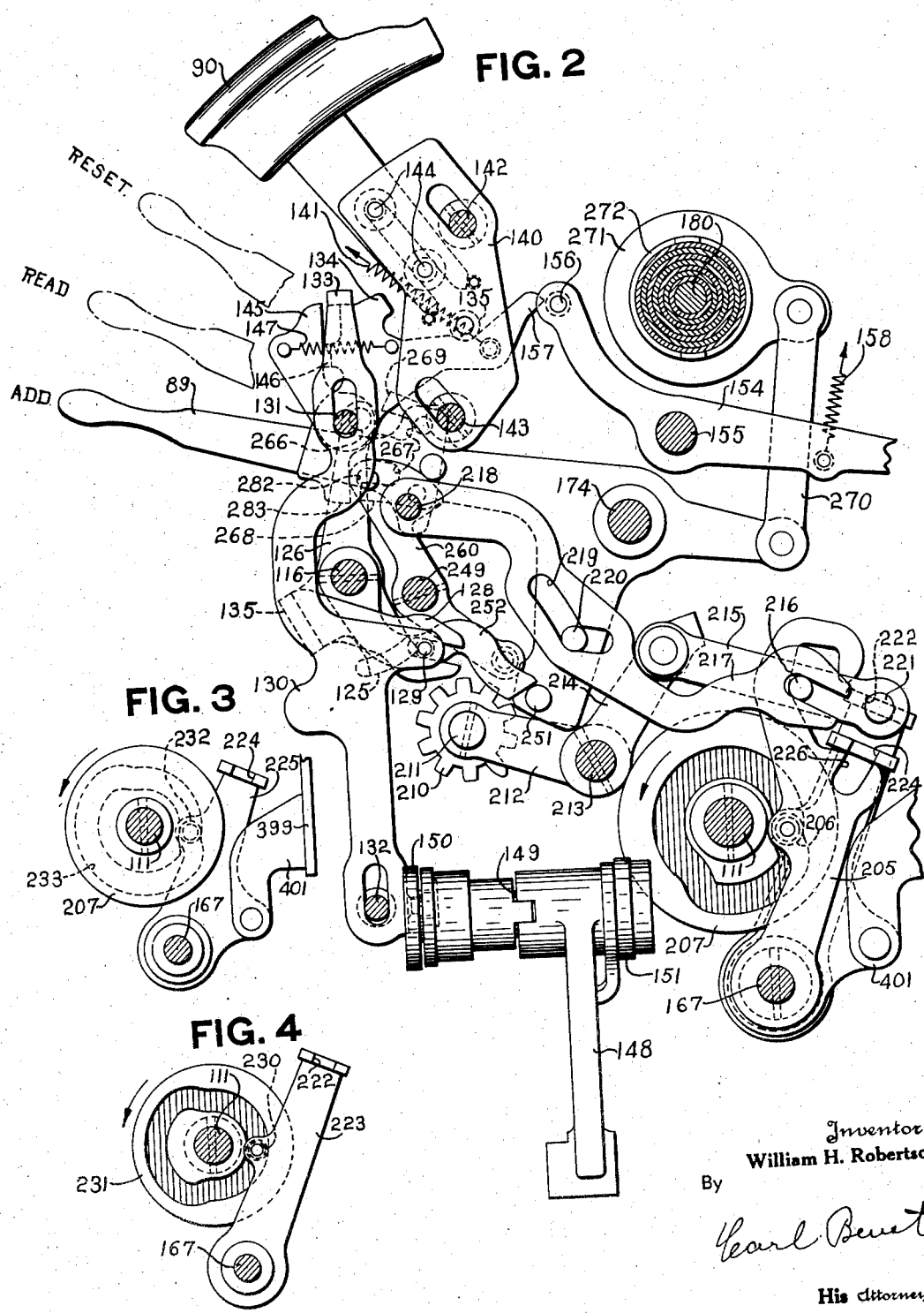

May 18, 1937.  W. H. ROBERTSON  2,080,507
CASH REGISTER
Filed Oct. 27, 1933  17 Sheets-Sheet 3
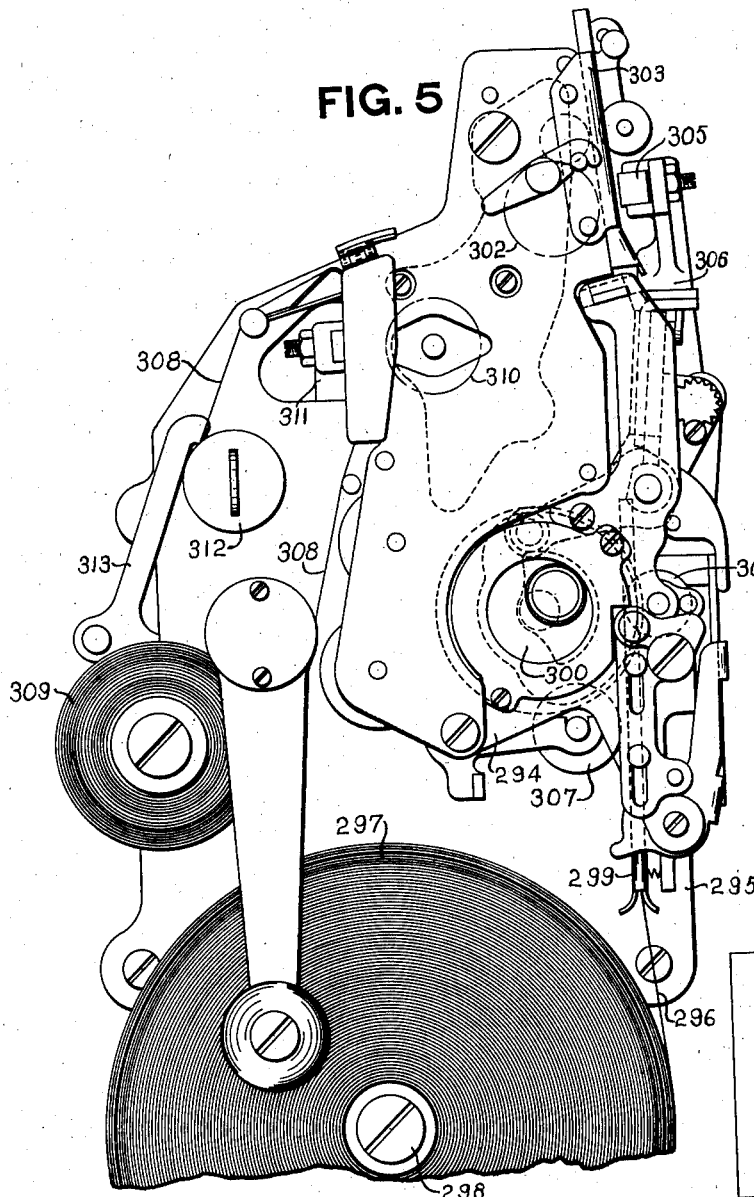
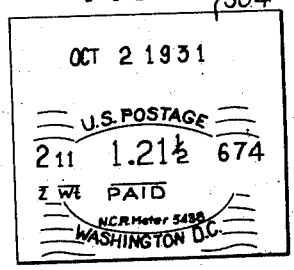
Inventor
William H. Robertson
By
Earl Benst
His Attorney May 18, 1937. W. H. ROBERTSON 2,080,507
CASH REGISTER
Filed Oct. 27, 1933 17 Sheets-Sheet 4

Inventor
William H. Robertson
By
Earl Beust
His Attorney

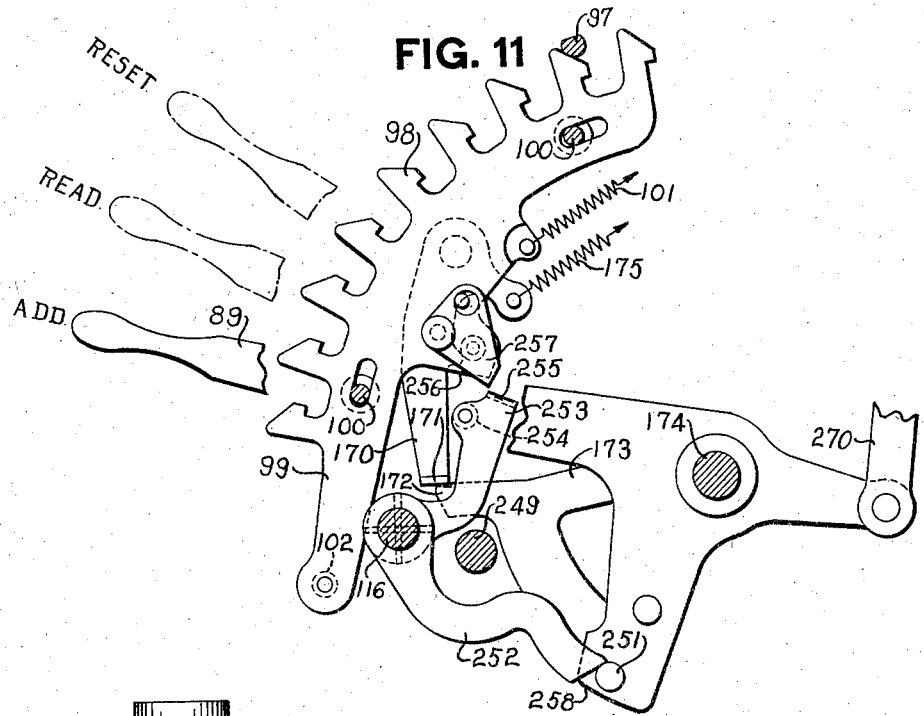
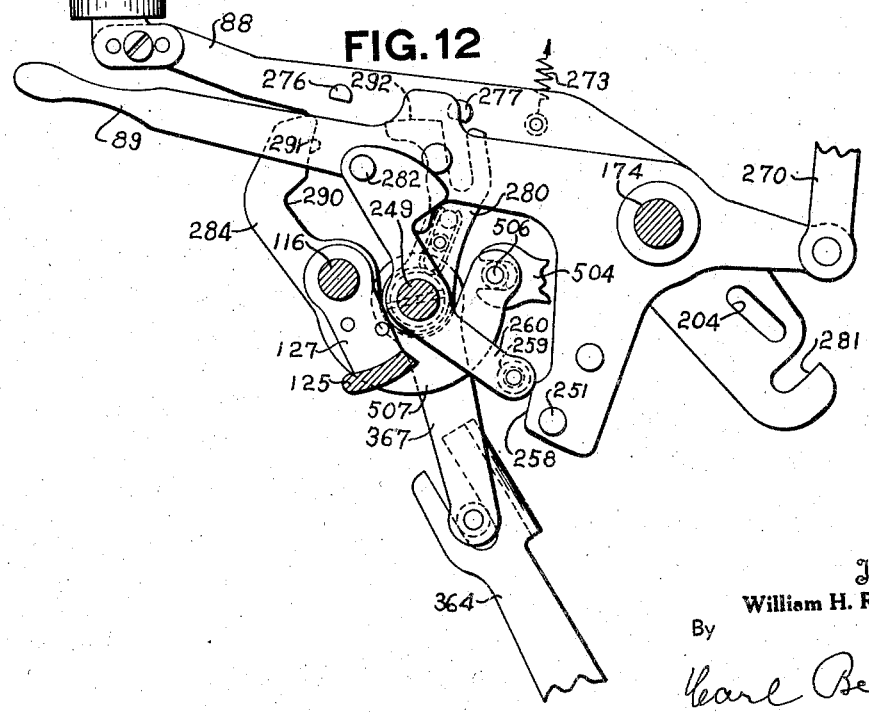

May 18, 1937.   W. H. ROBERTSON   2,080,507
CASH REGISTER
Filed Oct. 27, 1933   17 Sheets-Sheet 6

Inventor
William H. Robertson
By
Earl Benst
His Attorney

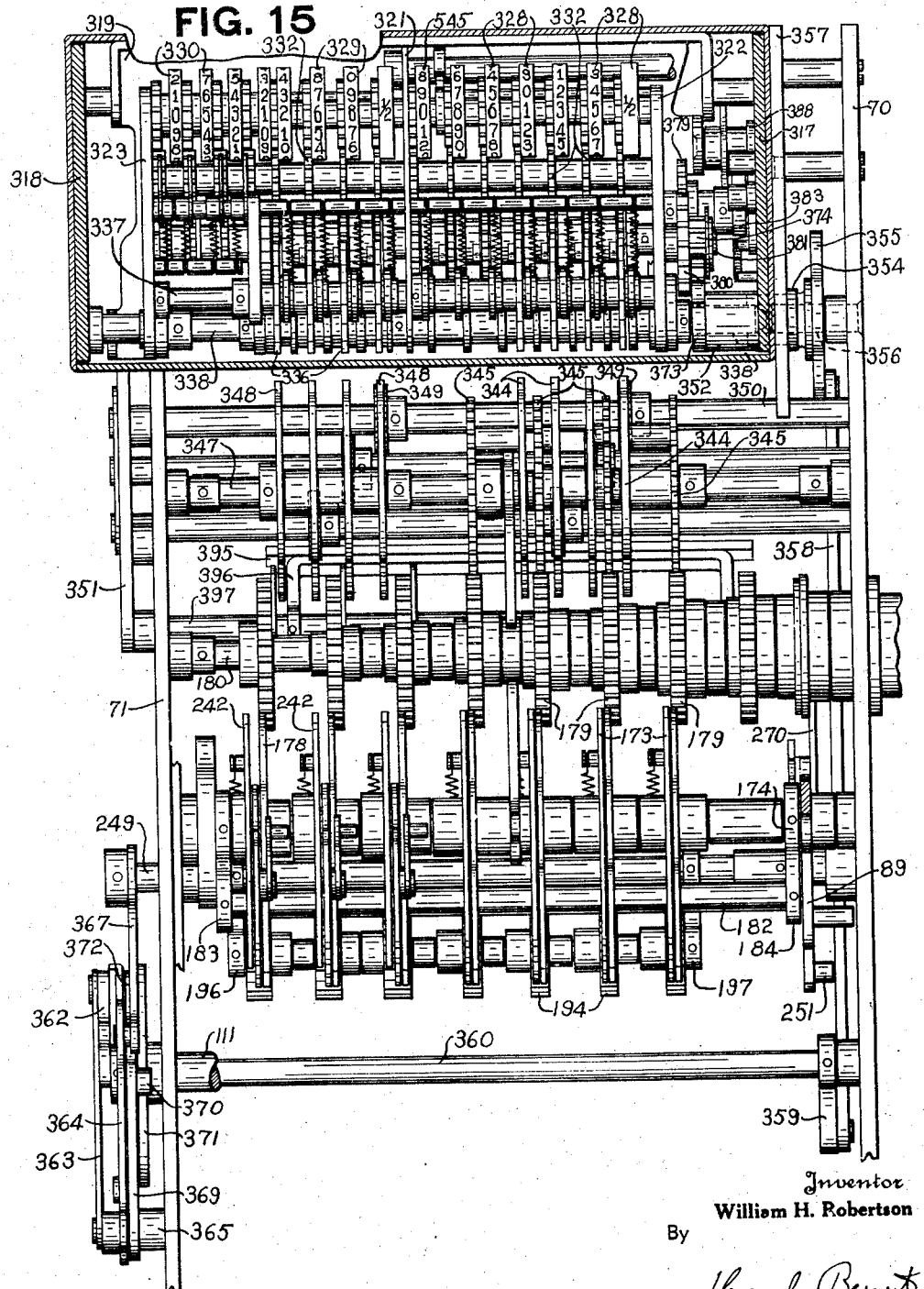

May 18, 1937.　　　　W. H. ROBERTSON　　　　2,080,507
CASH REGISTER
Filed Oct. 27, 1933　　　　17 Sheets-Sheet 8
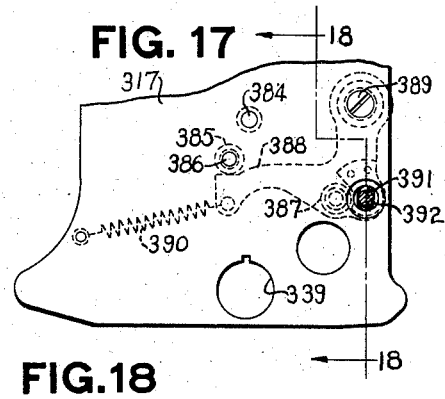
FIG. 17
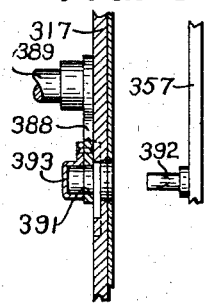
FIG. 18
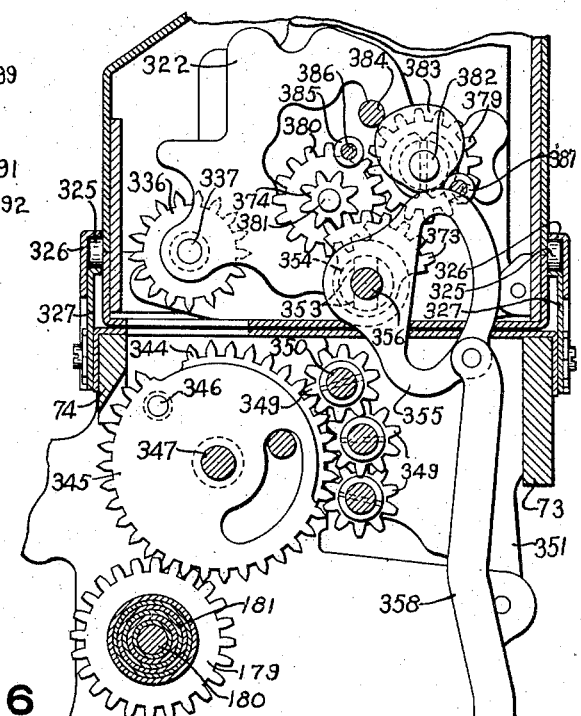
FIG. 16
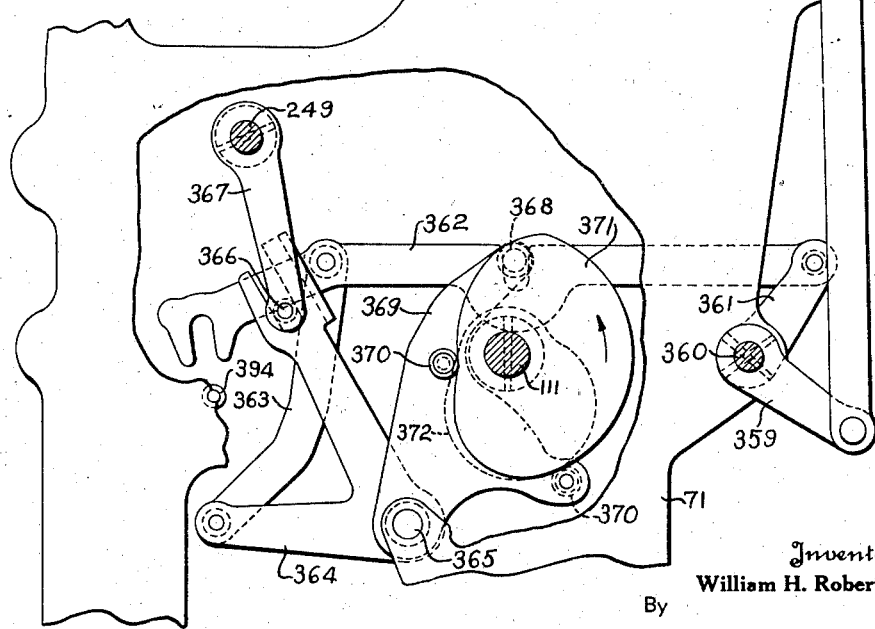
Inventor
William H. Robertson
By
Carl Beust
His Attorney

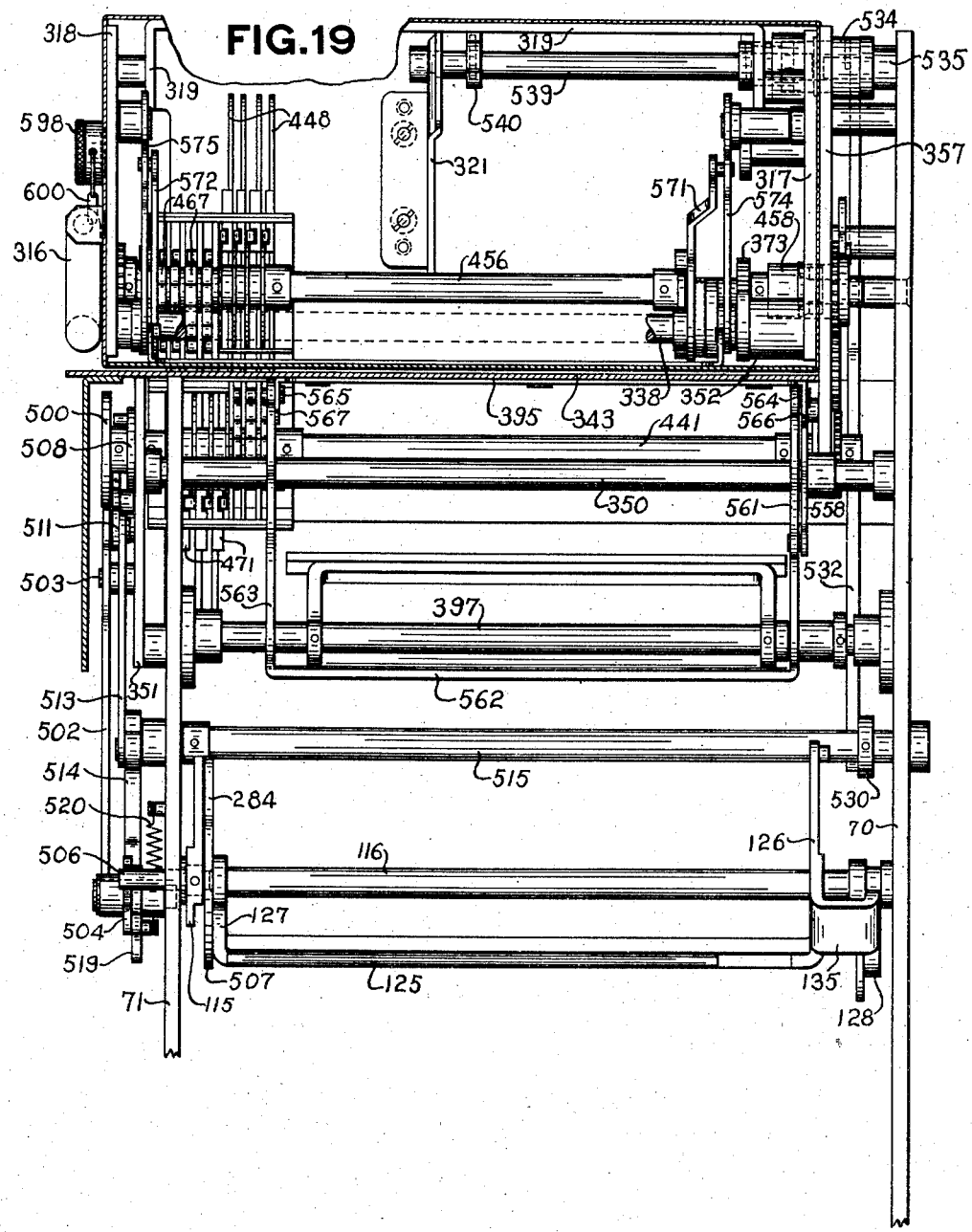

May 18, 1937.　　W. H. ROBERTSON　　2,080,507
CASH REGISTER
Filed Oct. 27, 1933　　17 Sheets-Sheet 10

Inventor
William H. Robertson
By Carl Beust
His Attorney

May 18, 1937.  W. H. ROBERTSON  2,080,507
CASH REGISTER
Filed Oct. 27, 1933  17 Sheets-Sheet 11

Inventor
William H. Robertson
By
Earl Beust
His Attorney

May 18, 1937.  W. H. ROBERTSON  2,080,507
CASH REGISTER
Filed Oct. 27, 1933   17 Sheets—Sheet 12
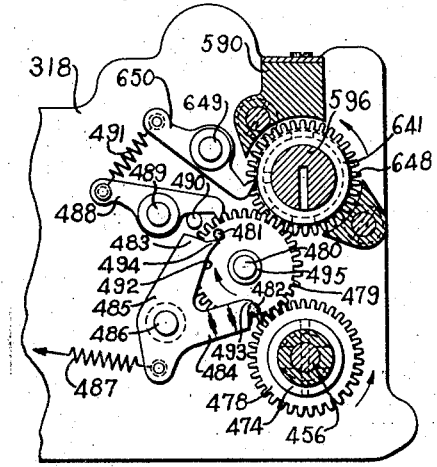
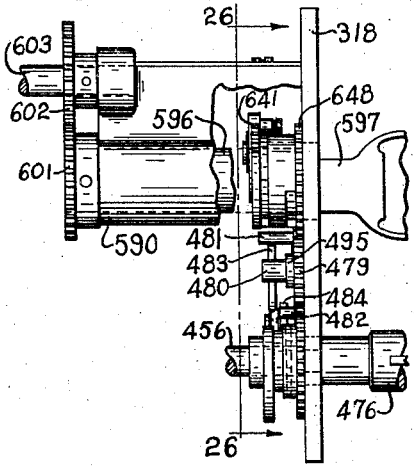
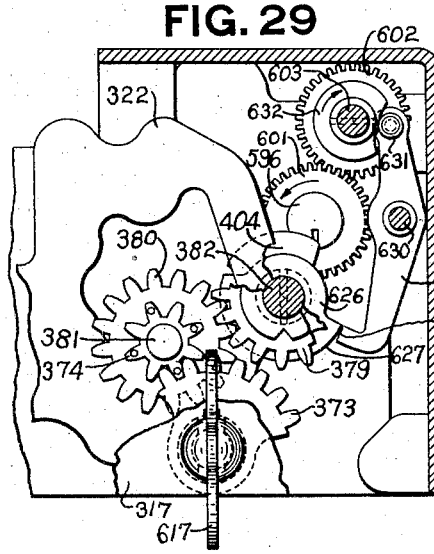
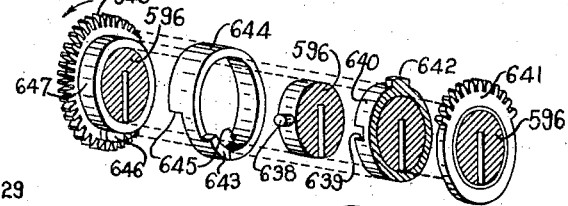
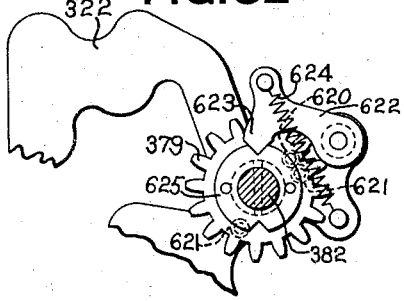
Inventor
William H. Robertson
By
Hearl Benst
His Attorney May 18, 1937.  W. H. ROBERTSON  2,080,507

CASH REGISTER

Filed Oct. 27, 1933  17 Sheets-Sheet 13

FIG. 33
FIG. 34
FIG. 35
FIG. 36
FIG. 37
FIG. 38
FIG. 39

Inventor
William H. Robertson
By
Earl Bent
His Attorney

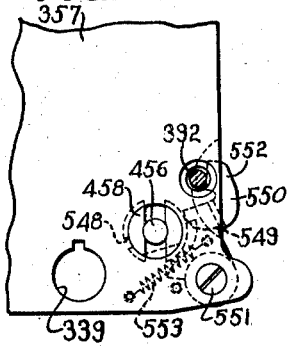
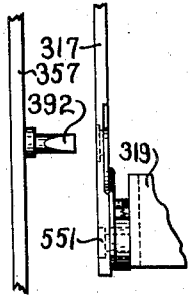
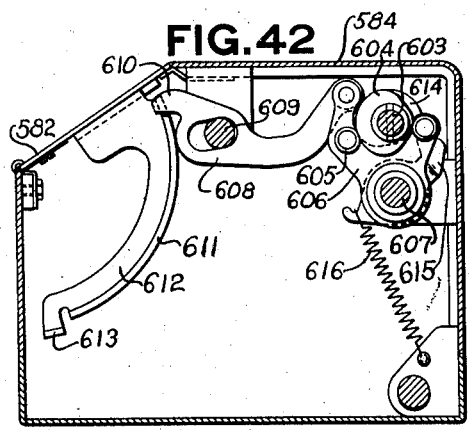
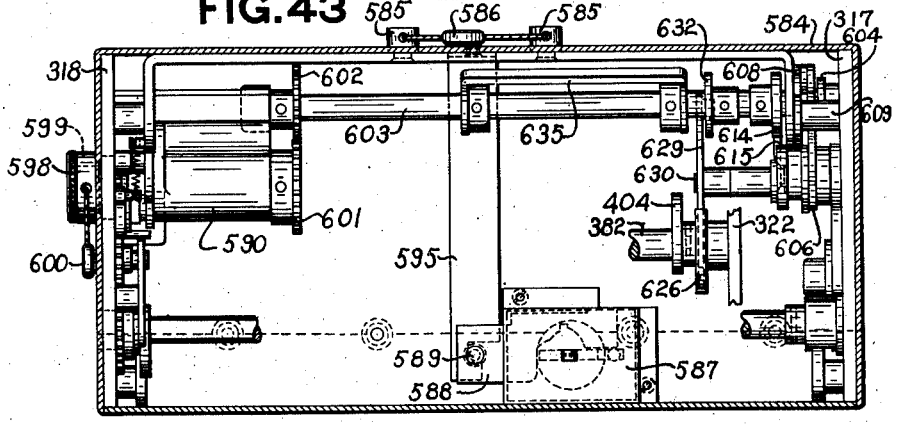
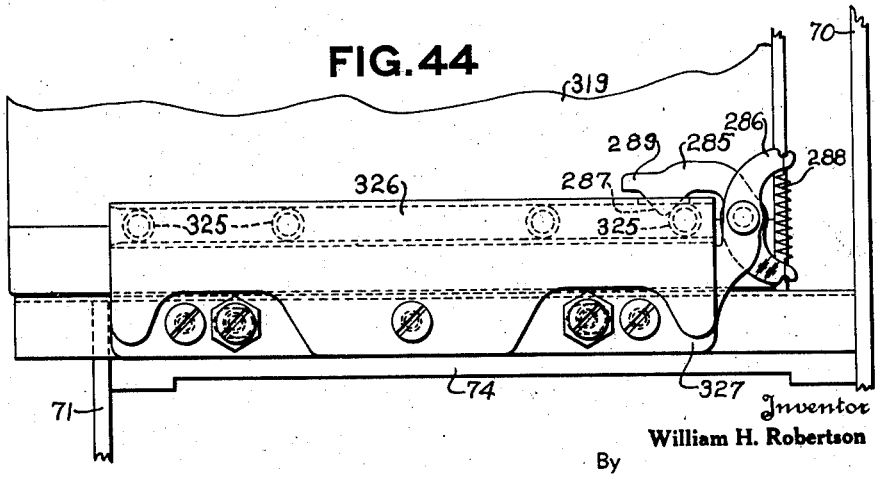

May 18, 1937. W. H. ROBERTSON 2,080,507
CASH REGISTER
Filed Oct. 27, 1933 17 Sheets-Sheet 15

Inventor
William H. Robertson
By
Karl Berust
His Attorney

May 18, 1937. W. H. ROBERTSON 2,080,507
CASH REGISTER
Filed Oct. 27, 1933 17 Sheets-Sheet 16

Inventor
William H. Robertson
By
Earl Beust
His Attorney

May 18, 1937.  W. H. ROBERTSON  2,080,507
CASH REGISTER
Filed Oct. 27, 1933   17 Sheets-Sheet 17

Inventor
William H. Robertson
By
Earl Beust
His Attorney

Patented May 18, 1937

2,080,507

UNITED STATES PATENT OFFICE 2,080,507

CASH REGISTER

William H. Robertson, Dayton, Ohio, assignor to The National Cash Register Company, Dayton, Ohio, a corporation of Maryland Application October 27, 1933, Serial No. 695,519

23 Claims. (Cl. 235—130)

This invention relates to registers, ticket issuing machines and the like, but more particularly to improvements in machines of the type disclosed in Letters Patent of the United States No. 1,816,263, issued July 18, 1931, to William H. Robertson, and in co-pending applications for Letters Patent of the United States, Serial Numbers 419,938 filed January 10, 1930 (Patent No. 2,056,485), and 553,329 filed July 27, 1931 (Patent No. 2,056,486), by William H. Robertson.

Machines of the type disclosed in the above mentioned patents are small, compact and light in weight, yet are provided with a full complement of keys and other manipulative devices to control said machine to perform all the functions usually attributed to larger and more costly machines. These functions include generally the accumulation of amounts on one or more totalizers, printing the amounts and other data on a plurality of record materials, making repeat operations, totalizing operations, etc. Such machines are admirably adapted for use in motor busses, trolleys, and other media of transportation, ticket offices, telegraph offices, department stores, etc., and are readily susceptible for use in many other lines of business.

The machines disclosed in Robertson's applications, Serial Numbers 419,938 and 553,329, mentioned above, are particularly adapted for printing and recording transactions and for issuing gummed postage labels or stamps, said machines printing the date, serial number or consecutive number of the label, permit or meter number, zone, weight and department in which the label is to be affixed, the amount of the postage, the post office and State where the parcels were mailed. The above data were also printed on permanent record strips locked in the machines and on issuing record strips adapted to be detached and sent to the post office with each lot of packages. This serves as a check on the postage issued by the machine. The machine disclosed in the earlier patent application Serial No. 419,938, while giving the information desired, was not properly guarded against mal-operations by those intending to defraud the Government. The machine of the later application, Serial No. 553,329, gives the desired information and is adequately protected against mal-operations, but in order to check the postage and reset the postage totalizer it is necessary to deliver this machine to the post office department. Irrespective of the fact that this type of machine is light and compact, as cash registers go, nevertheless in actual use it was discovered they are inconvenient for one person to carry any distance.

One object of this invention is to provide a stamp-issuing machine for use in post offices, mail order establishments and various other businesses where parcels of varying sizes and weights are prepared for mailing.

Another object is to supply such a machine with a light and compact totalizing device or postage meter that may be easily removed from said machine and easily transported to the post office for checking and resetting.

Another object is to supply means to set the removable totalizing device to any desired amount and to provide means to lock the machine against operation when the amount thus set is exhausted.

Another object of this invention is to provide a machine of the type indicated with a novel means to lock the machine against operation after the total has exceeded a predetermined capacity.

Still another object is to provide means whereby the removable totalizer in passing through zero locks the machine against operation.

A further object is to provide novel means for locking the removable totalizing device in the machine.

A still further object is to provide means for locking the machine against operation when the totalizing device is removed therefrom.

Other objects of the instant invention are to provide the removable totalizing device with a plurality of locks so connected that they may be operated only in proper sequence; to supply novel means for restoring the transfer mechanism after the removable totalizing device is reset; to furnish a novel lock for locking the removable totalizing device in the machine, part of said lock being embodied in the removable totalizing device and part in the machine proper, either part of said lock being interdependent upon the other for operation.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said drawings:

Fig. 2 is a side elevation of the machine releasing mechanism and the totalizing mechanism.

Fig. 3 is a detail view of the cam and arm that engages the main totalizer with its actuators in read or sub-total operations.

Fig. 4 is a detail view of the cam and arm that engages the main totalizer with its actuators in adding operations.

Fig. 5 is an elevation of the right side of the machine showing the printing mechanism.

Fig. 6 discloses a fragment of the detail strip.

Fig. 7 is a facsimile of a gummed postage stamp issued by the instant machine.

Fig. 8 is a facsimile of an insertable slip used in checking the total postage on a certain lot of parcels.

Figure 9:
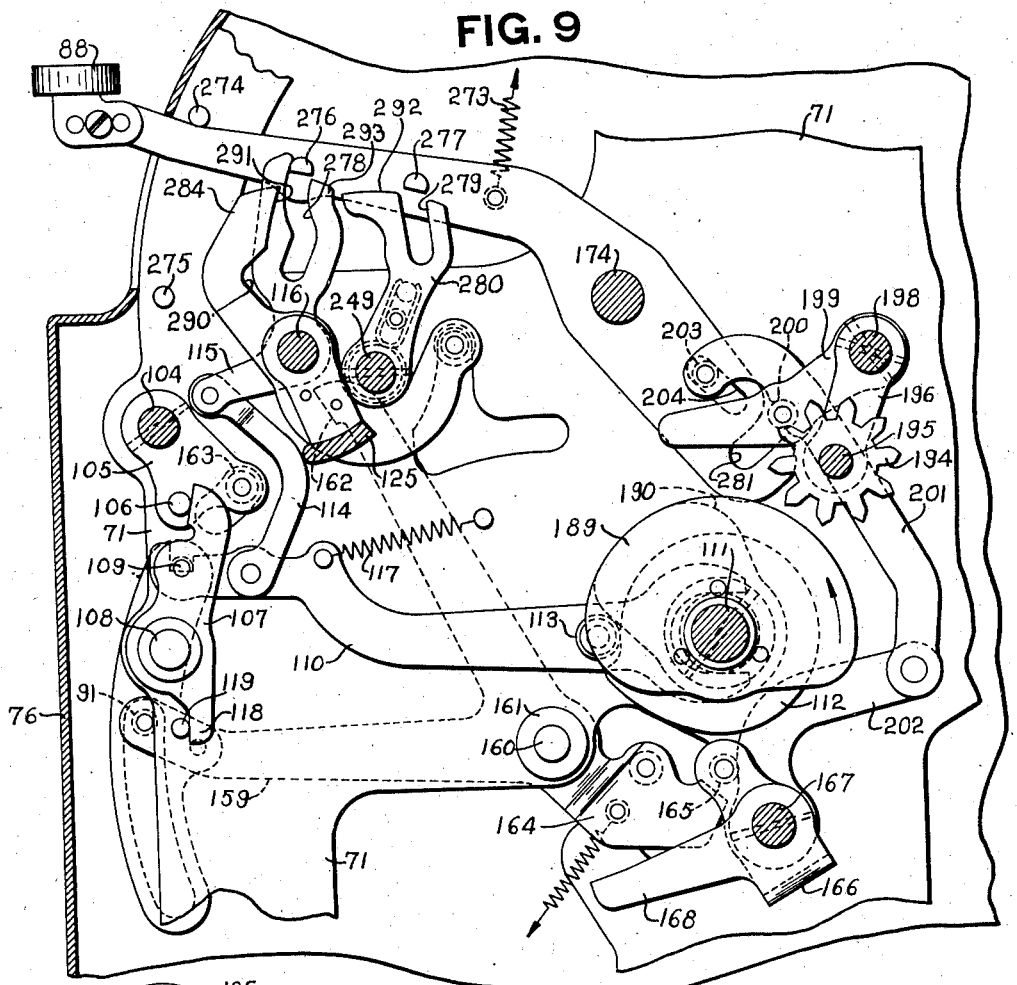

Fig. 9 is a side elevation as observed from the right illustrating the repeat key mechanism.

Figure 10:
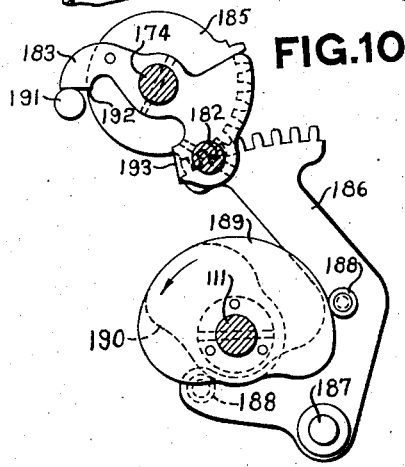

Fig. 10 is a detail view of the differential actuator driving mechanism.

Fig. 11 is a detail view of the total control lever and a part of its associated mechanism.

Fig. 12 is a detail view picturing the interlock between the repeat key and the total control lever.

Figures 13, 14:
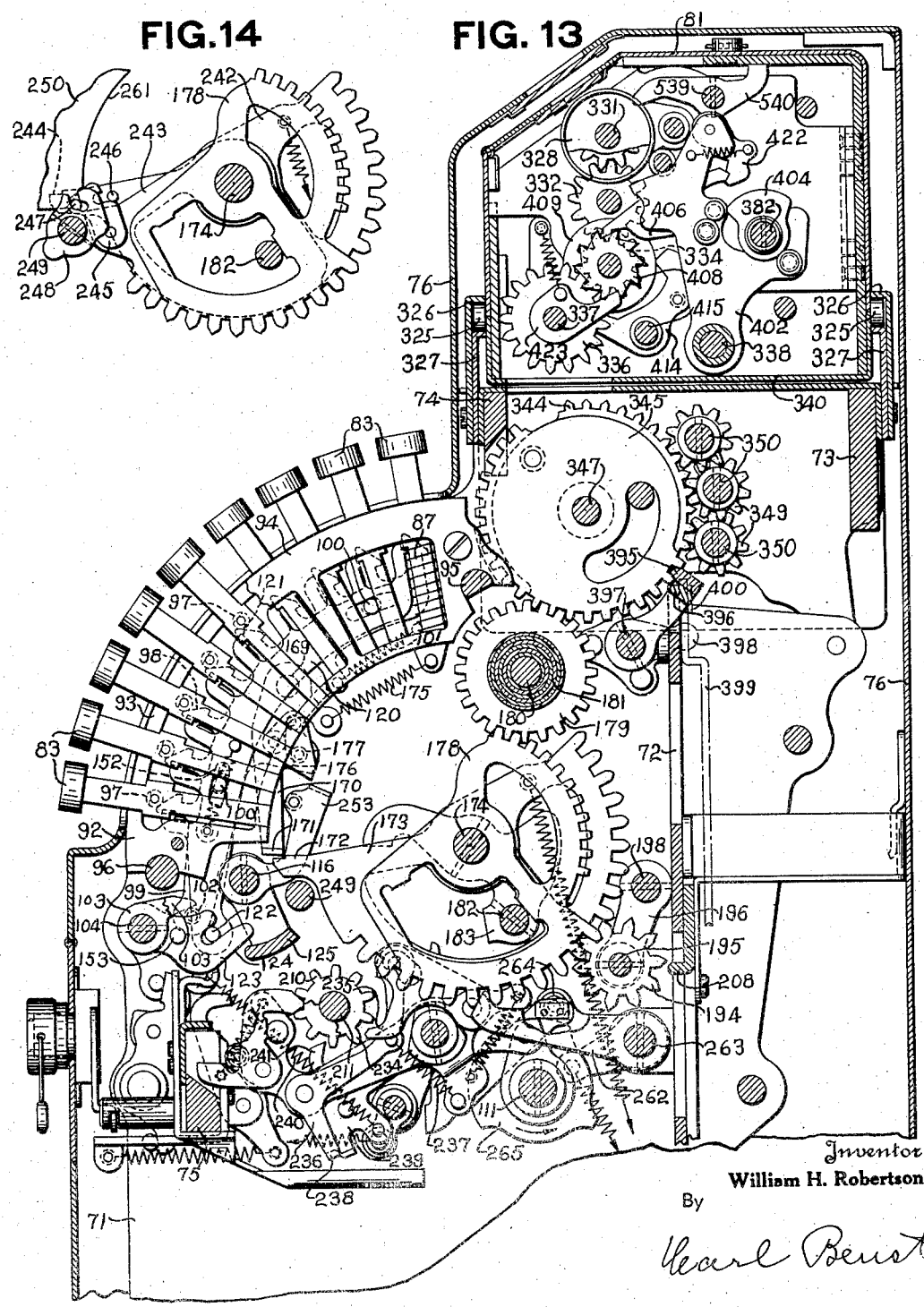

Fig. 13 is a sectional view through the machine taken just to the right of one of the amount banks.

Fig. 14 is a detail view of an amount differential actuator unit.

Fig. 15 is a front elevation showing in particular the amount differential actuators, the printer tube line and the removable totalizer unit.

Fig. 16 is a side elevation of the mechanism that engages the removable totalizers with their actuators.

Fig. 17 is a detail view of the arm which renders the engaging mechanism for the removable totalizer unit ineffective when said unit is removed from the machine.

Fig. 18 is a sectional view taken along line 18—18 of Fig. 17, looking in the direction of the arrows.

Fig. 19 is a skeletonized rear elevation illustrating in particular the method of locking the removable totalizer unit in the machine.

Figure 20:
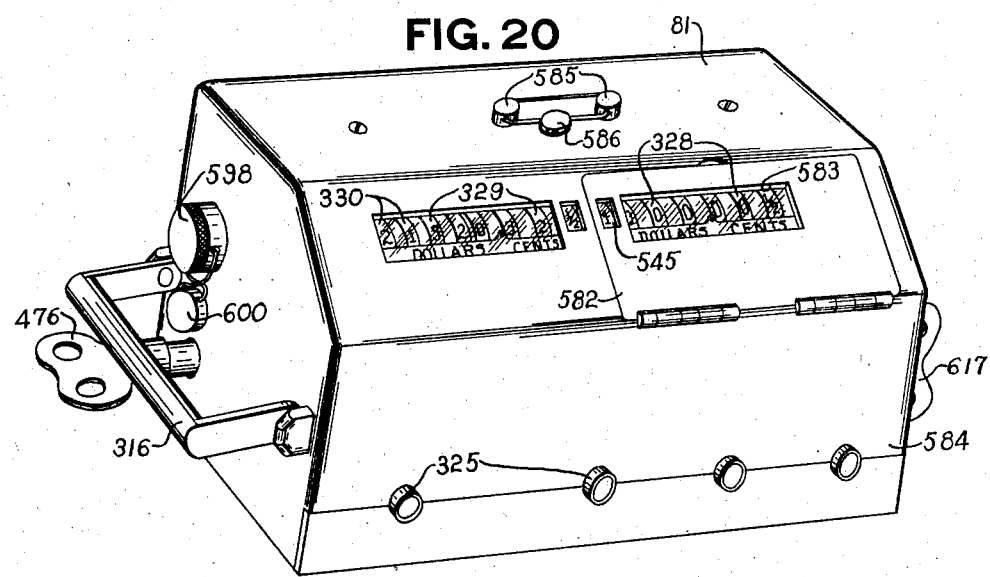

Fig. 20 is a perspective view of the complete removable totalizer unit or postage meter.

Figure 21:
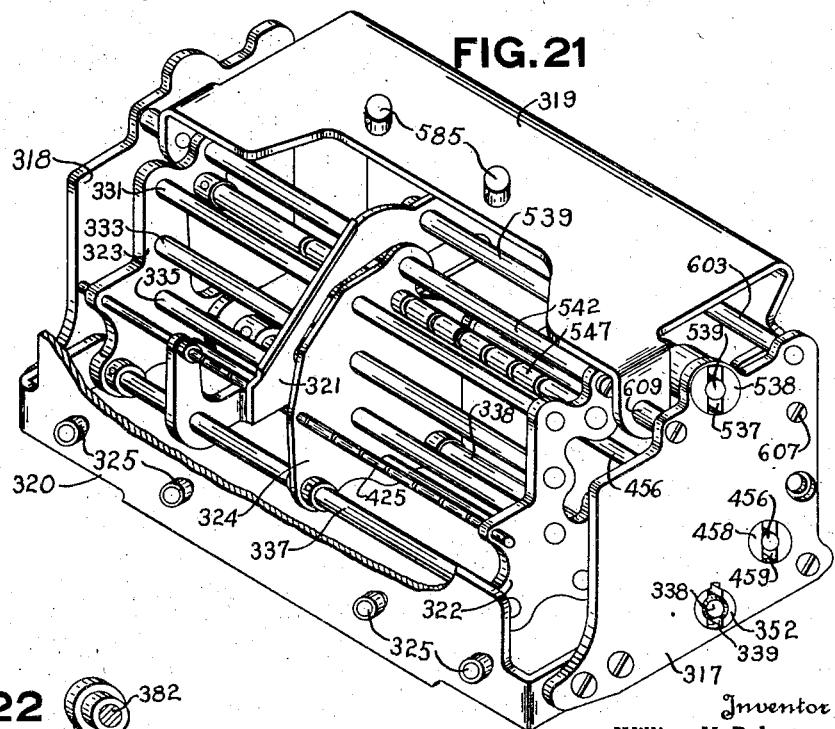

Fig. 21 is a perspective view of the frames, braces and shafts of the removable postage meter.

Figure 22:
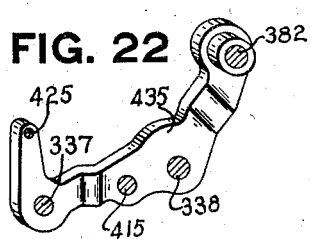

Fig. 22 is a detail perspective of one of the brace members of the removable totalizer unit.

Figure 23:
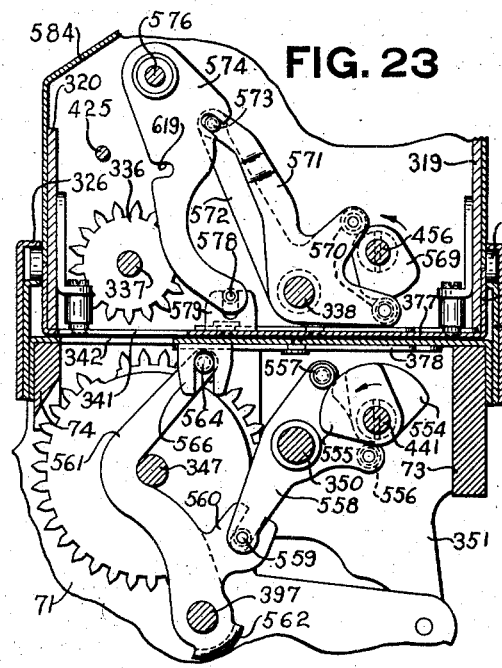

Fig. 23 is an end view as observed from the right, illustrating the mechanism for shielding the openings between the removable totalizer unit and the machine proper.

Figure 24:
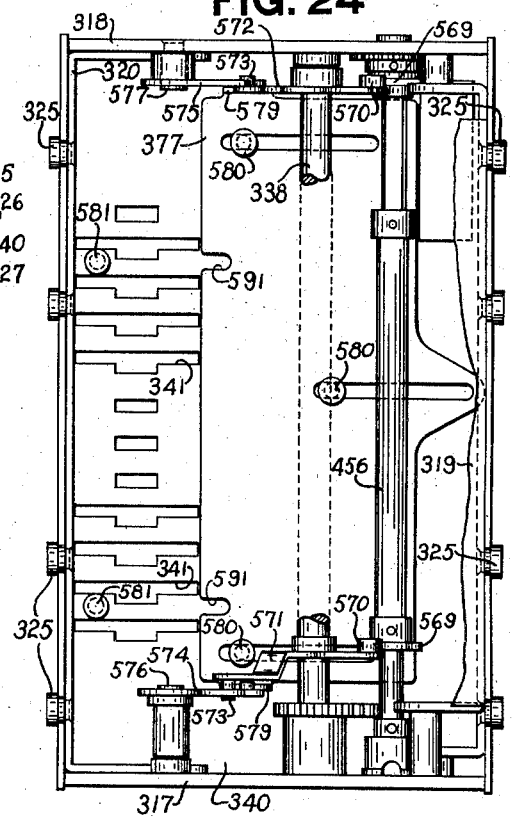

Fig. 24 is a view as observed from above, showing the removable totalizer shield and its operating mechanism.

Figure 25:
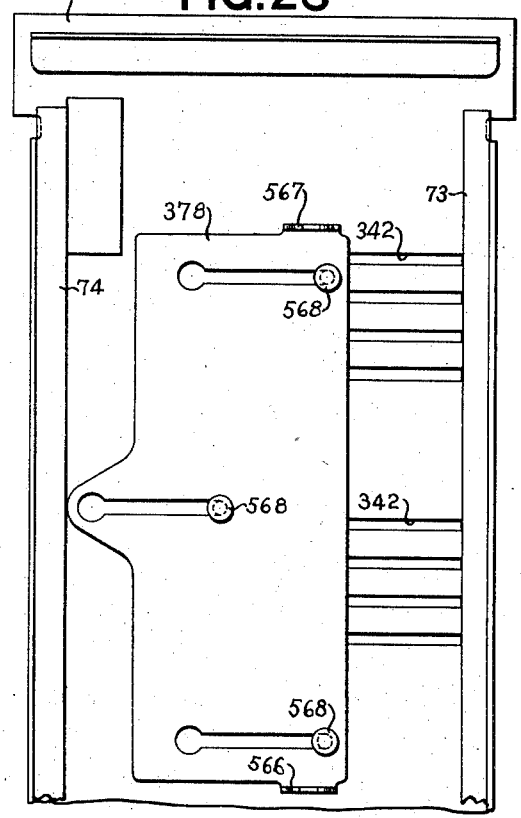

Fig. 25 is a view as observed from below, showing the shield plate for the machine proper.

Fig. 26 is a sectional view of part of the locking mechanism for the removable totalizers taken along line 26—26 of Fig. 27, looking in the direction of the arrows.

Fig. 27 shows part of the control and closure locking mechanisms employed in the postage meter.

Fig. 28 is a detail view of the locating disk and locating pawl for the reset closure lock.

Fig. 29 is an end view illustrating in detail the interlocks between the transfer line and the reset closure lock.

Fig. 30 is a disassembled perspective view of the sequence control mechanism which enforces proper manipulation of the reset closure and the control locks.

Fig. 31 is a perspective view showing in detail the transfer disabling key and its segment.

Fig. 32 is a detail view of the transfer shaft locating disk and pawl.

Fig. 33 is a sectional view of the removable totalizer transfer mechanism taken just to the right of the 10-cent amount wheel, showing said mechanism in its home position.

Fig. 34 is a sectional view showing the relative positions of parts illustrated in Fig. 33 when the removable totalizer is engaged with its actuators.

Fig. 35 shows one of the transfer pawls of the removable totalizer unit shifted to effective position.

Fig. 36 is a sectional view of a transfer tripping and driving unit for the postage totalizers.

Fig. 37 is a detail view of one of the transfer tripping pawls and its tripping cam.

Fig. 38 illustrates the transfer mechanism between the ½-cent amount wheel and the one-cent amount wheel.

Fig. 39 is a sectional view of the removable totalizer unit taken just to the right of the one hundred dollar amount wheel.

Fig. 40 is a detail view of the means for locking the meter control lock against operation when the postal meter is removed from the machine.

Fig. 41 is an end view of the mechanism shown in Fig. 40.

Fig. 42 is a sectional end view of the meter cabinet showing the door enclosing the decreasing postage totalizer and the means for locking said door in its shut position.

Fig. 43 is a top sectional view of the meter cabinet showing the reset closure locking mechanism and the lock for locking the cabinet on the meter.

Fig. 44 is a front view illustrating the means for locating the meter in the machine.

Figure 45:
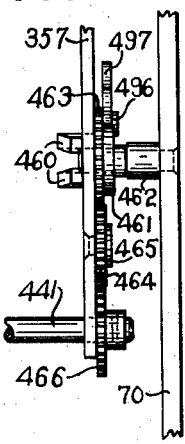
Figure 46:
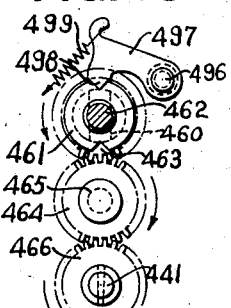

Fig. 45 is an edge view of the mechanism shown in Fig. 46.

Fig. 46 is a detail view of the control lock driving gears and their locating mechanism.

Figure 47:
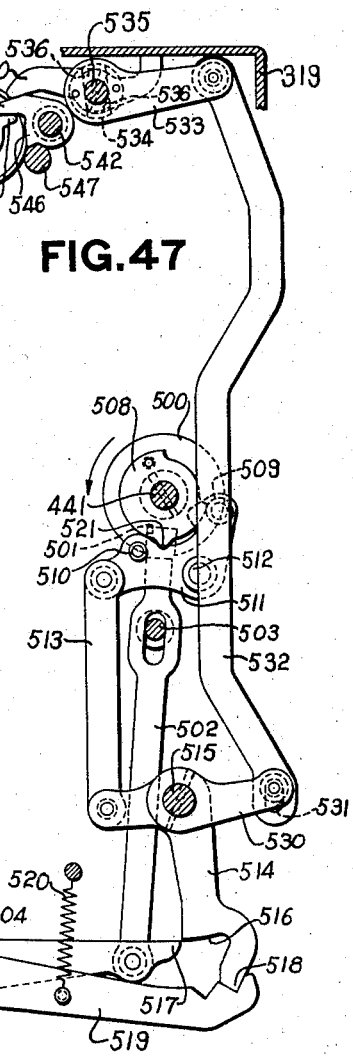

Fig. 47 is a side elevation as observed from the right illustrating the mechanism for locking the machine against releasing when the amount on the decreasing postage totalizer has been exhausted.

Figure 48:
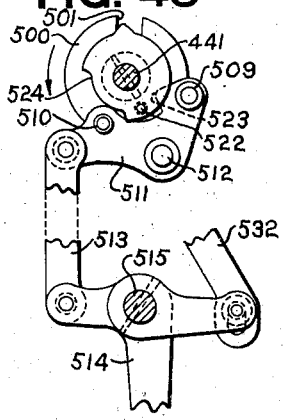

Fig. 48 is a detail view of part of the mechanism shown in Fig. 47.

Figure 49:
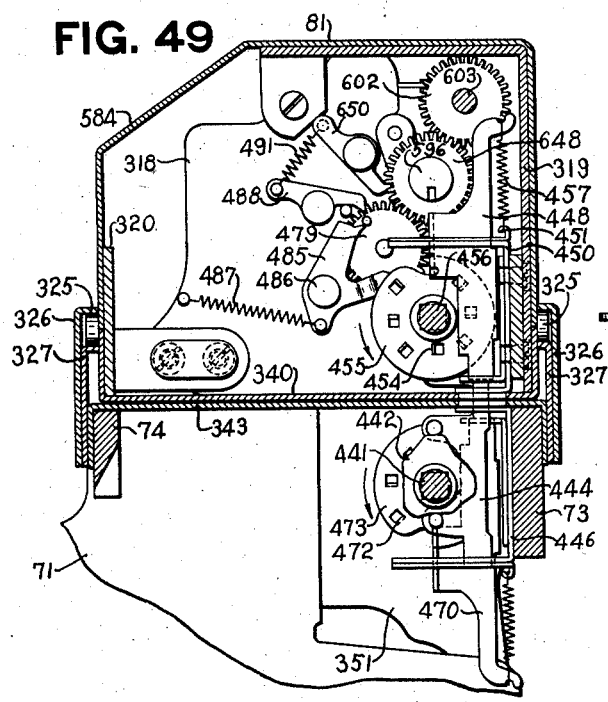

Fig. 49 is a sectional view as observed from the right, showing the control lock mechanism.

Figure 50:
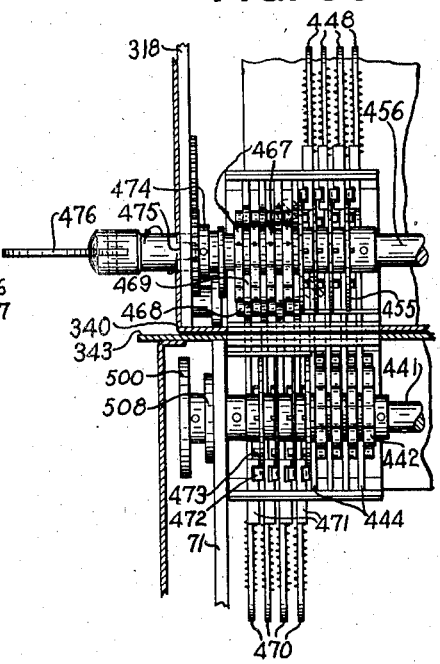

Fig. 50 is a front view of the mechanism shown in Fig. 49.

Figure 51:
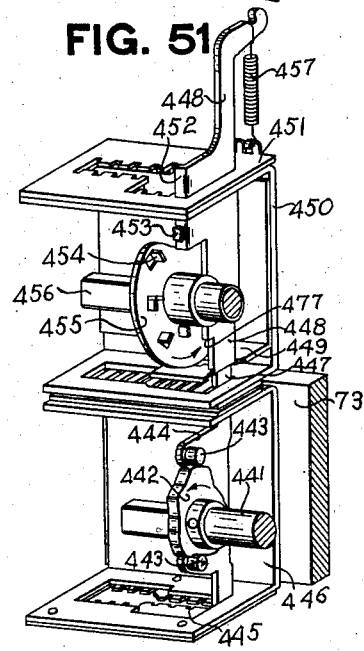

Fig. 51 is a fragmentary perspective of one of the control locking bars, its selecting disk and its operating cam.

Figure 51A:
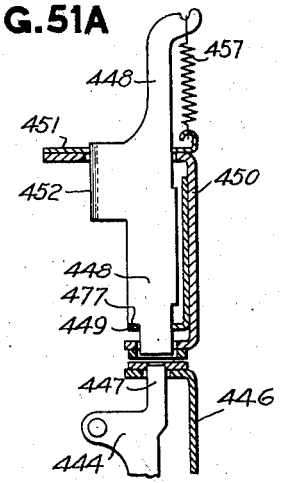

Fig. 51A is an enlarged detail view showing fragments of the control lock in unlocking position.

Figure 52:
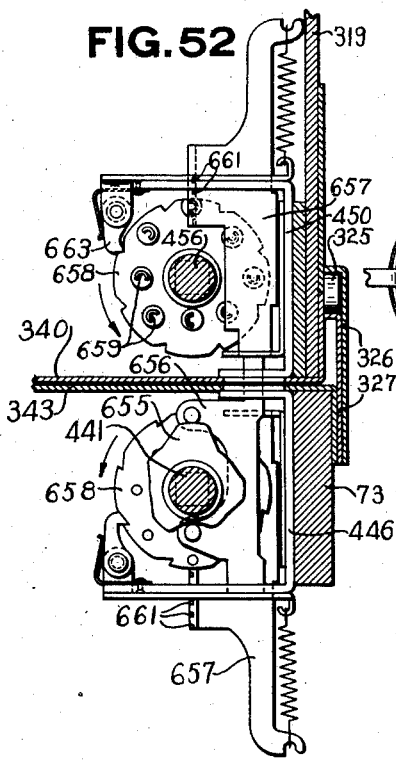

Fig. 52 is a sectional side view of a modified form of control locking mechanism.

Figure 53:
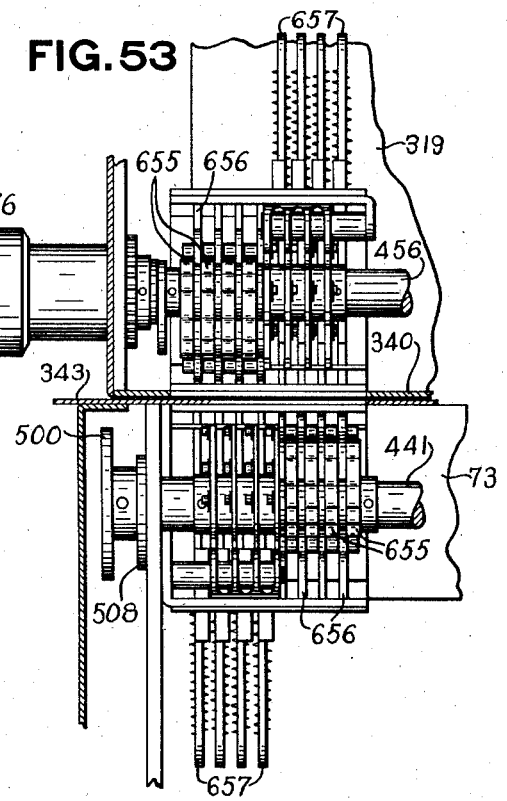

Fig. 53 is a sectional view as observed from the front of the machine, showing the modified form of control locking mechanism.

Figure 54:
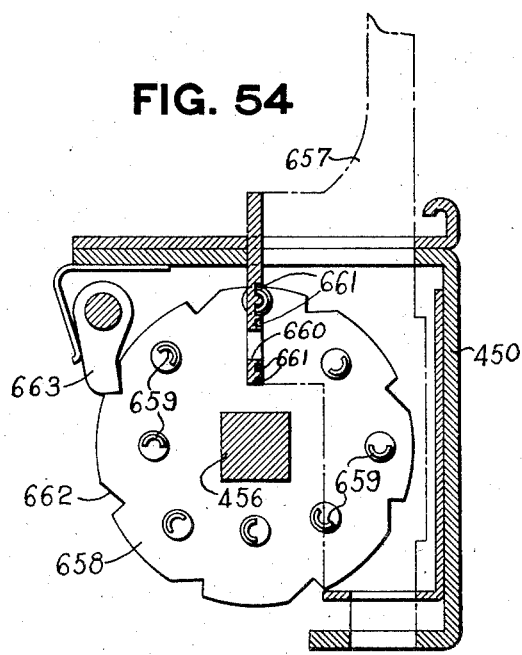

Fig. 54 is an enlarged view illustrating one of the selecting disks of the modified form of control lock.

Figure 55:
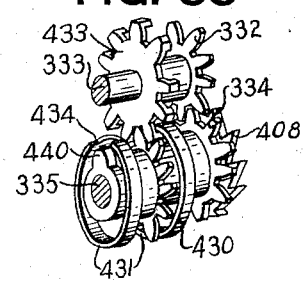

Fig. 55 is a perspective of the Geneva transfer mechanism used in the overflow section of the increasing postage totalizer.

General Description

The machine disclosed in this application is arranged for recording postage and for printing and issuing gummed postage labels for all classes of mail. However, it is particularly adapted for use where numerous packages of varying sizes and weights are prepared for mailing.

The machine of this invention is small, compactly arranged, and enclosed in a suitable cabinet. The keyboard has a plurality of rows of flexible amount keys, two rows of weight keys and one row of zone keys. The amount keys control the three totalizers with which this machine is equipped, one of which is the regular totalizer embodied in the machine proper, and is controlled for adding, reading and resetting operations by means of a manipulative member located on the righthand side of the machine.

The other two totalizers and their transfer mechanisms are enclosed in a metal box or cabinet, which is removably supported in the machine proper and is enclosed by the machine cabinet. This entire unit which will hereinafter be referred to as the postage meter occupies the space generally occupied by the indicator mechanism which has been omitted in this machine. One of the totalizers of the postage meter is arranged to accumulate positive amounts and cannot be reset. The other totalizer in the postage meter is arranged to accumulate negative amounts, that is, the wheels of the negative totalizer may be set to any desired amount, and after this amount is exhausted, the machine is automatically locked against further operation. These two totalizers contained in the postage meter will hereinafter be referred to as the positive or increasing, and negative or decreasing postage totalizers.

When the pre-set amount on the negative postage totalizer is exhausted the proprietor may by using the key to the control lock unlock the postage meter from the machine and deliver said meter to the proper postal authorities for checking and resetting. The postal authorities have exclusive control of a key to a door or closure in the meter cabinet which gives access to the negative postage totalizer. However, before the reset closure can be opened it is necessary to insert a wrench, also in possession of the postal authorities, in the postage meter, and turn said wrench part of a revolution to release all the transfer pawls from operative engagement with the negative totalizer wheels. This makes it possible to turn the reset closure key one-half revolution which unlocks the closure, after which the wheels of the negative totalizer may be set to the desired amount by turning them with the finger, a pencil or any other suitable article. After the desired amount has been set on the negative postage totalizer the closure is locked by turning the key another one-half revolution to normal position, after which the transfer wrench may be turned back to normal position and removed from the postage meter. The postage meter may now be inserted in the machine and locked in place by turning the control key one-half revolution to normal position.

A sequence controlling mechanism between the reset closure lock and the control lock forces proper operation of these locks. For example, it is impossible to turn the reset closure lock until the control lock has been turned one-half revolution to unlock the postage meter from the machine. Likewise it is impossible to turn the control lock a complete revolution to normal position until the reset closure lock has been turned a complete revolution thus indicating that the negative postage totalizer has been reset and its closure locked shut.

It is also impossible to turn the reset lock until the transfer wrench has been inserted within its receptacle and turned to disengage all the transfer pawls. Likewise it is impossible to remove the transfer wrench from its receptacle until the reset closure lock has been turned a complete revolution.

As previously stated, overdrawing the negative postage totalizer locks the machine against operation and the machine remains thus locked until the postage meter is moved therefrom, the negative postage totalizer reset, and the meter replaced within the machine. Initial movement of the control lock also locks the machine against releasing and this lock remains effective until the meter is replaced in the machine and locked therein by means of said control lock.

The postage totalizers are engaged with the regular machine differential actuating mechanism through matched openings in the postage meter and the machine proper. Initial movement of the control lock to unlock the postage meter from the machine closes both sets of openings to prevent the possibility of tampering with the meter or the machine mechanism through these openings.

Moving the lever that controls the main totalizer from add position to read or reset position disables the engaging mechanism for the postage totalizers. Therefore, these totalizers are engaged with their actuators only in adding operations.

In the final analysis the dominating idea has been to construct a portable postage meter that may be easily delivered to the postal authorities for checking and setting, to make such a device practically tamper-proof, so that unscrupulous clerks, proprietors or post-office employees cannot manipulate the postage totalizer, thereby defrauding the Government of postage. To further this idea the meter cabinet and the machine cabinet are locked against removal, and can only be removed by the owner of the machine, who is in possession of the keys to the cabinet locks. This removal of the cabinets is necessary only when it is desired to inspect or repair the mechanism of the machine or meter.

In the detailed description following, the mechanism pertinent to this invention and briefly outlined above will be described in detail.

Detailed Description

Main frame work

The main mechanism of the instant machine is supported between a right side frame 70 (Figs. 15 and 19) and a left frame 71, mounted on a machine base (not shown). The frames 70 and 71 are connected by a back frame 72 (Fig. 13) and by brace bars 73, 74, and 75. The machine is enclosed by a cabinet or casing 76 (Fig. 1) having suitable openings therein for keys, operating crank, key release lever and other control members and is secured to the base of the machine by suitable screws or other fastenings. In addition to the usual fastening the cabinet 76 is locked on the machine by a lock 77 secured on a door 78 hinged to the cabinet 76. A door 79 provides access to the driving motor for the purpose of oiling said motor, cleaning the brushes, commutator, etc. A door 80 provides access to a compartment in the top of the cabinet where a postage meter 81 is housed. In order that the condition of the postage totalizers may be observed, a window 82 (Fig. 1) is provided in the cabinet 76.

Keyboard

The keyboard of the instant machine comprises three rows of amount keys 83, (Figs. 1 and 13), a one-half cent key 84, two rows of weight keys 85, and one row of zone keys 86. These keys with the exception of the one-half cent key, are known as flexible keys in that after one key has been depressed in any of the several rows, depression of another key in the same row releases the key previously depressed in that row, and so on. Each of the keys 83, 84, 85, and 86 is provided with a spring 87 wound around its stem, which is tensioned to restore said key to its upward position when released. To the left of the keyboard is a repeat key 88, depression of which causes the immediately preceding transaction to be duplicated.

Situated to the right of the keyboard is a total control lever 89, which controls the postage totalizers in adding operations and the main totalizer in adding, reading and resetting operations. Depression of a starting bar 90 clutches an electric motor (not shown) to the machine driving mechanism and simultaneously closes an electric switch for controlling the current to the motor. At the end of machine operations the motor is automatically declutched from the driving mechanism and the switch simultaneously opened.

Protruding through a slot in the left side of the cabinet 76 is a release knob 91. Moving this knob downwardly releases any depressed amount, weight or zone key.

Inasmuch as the construction of the keyboard of this machine is similar to that disclosed in the Robertson patent and applications referred to at the beginning of this specification, and inasmuch as all the different banks of keys of the instant machine are similar in construction, it is felt that a detailed description of one amount bank will be sufficient to fulfill the purpose of this specification. Calling attention to Fig. 13, each amount bank 92 is composed of nine amount keys 83, slidably mounted in a frame 93, supported in a pair of guide plates 94, only one here shown. The key banks 92 are supported on rods 95 and 96 extending between the main frames 70 and 71. Each of the keys 83 carries a stud 97, which cooperates with an angular camming surface on a shouldered projection 98 of a flexible detent 99, slotted to slide on studs 100 carried by one of the plates 94.

Depression of one of the keys 83 causes the stud 97 to wipe along the angular camming surface of the projection 98, forcing the flexible detent 99 counterclockwise against the tension of a spring 101. When the stud 97 passes beyond the shoulder of the projection 98 the spring 101 returns said detent 99 a slight distance clockwise, causing the shouldered projection to engage a flat portion of the stud 97, to retain the key in depressed position. The lower end of the detent 99 carries a stud 102 which cooperates with an arm 103 secured on a shaft 104, opposite ends of which are journaled in the frames 70 and 71.

Referring to Fig. 9, the shaft 104 has secured thereon an arm 105 carrying a stud 106, which cooperates with the upper end of a lever 107 loose on a stud 108 fast in the frame 71. The lever 107 carries a stud 109 normally embraced by a slot in a pitman 110, the rearward end of which is bifurcated to embrace a main drive shaft 111 journaled in the main frames 70 and 71. Secured on the shaft 111 is a plate cam 112 the periphery of which cooperates with a roller 113 carried by the pitman 110. The forward end of the pitman 110 is connected by a link 114 to an arm 115 fast on a shaft 116 journaled in the frames 70 and 71. A spring 117 is tensioned to urge the pitman 110 rearwardly to retain the roller 113 in contact with the cam 112. The lower end of the lever 107 forms a projection 118 which cooperates with a stud 119, fast in the frame 71.

The shaft 111 makes one complete counterclockwise revolution at each machine operation, which causes the cam 112 cooperating with the roller 113 to force the pitman 110 frontwardly to rock the lever 107 counterclockwise. This, through the stud 106 and arm 105 rocks the shaft 104 clockwise (see also Fig. 13) causing the arms 103 in cooperation with the studs 102 to rock the detent 99 counterclockwise to disengage the shoulders of the projections 98 from the studs 97 in the keys 83. The springs 87 then return the depressed keys upward to their normal positions. Near the end of machine operations, the rise of the cam 112 passes beyond the roller 113 allowing the pitman to be returned to its normal position, as shown in Fig. 9, by the spring 117. Obviously this returns the lever 107 clockwise to its normal position as here shown. The springs 101 return the detents 99 and the shaft 104 to their normal positions as shown in Fig. 13. There is one such detent 99 and arm 103 for each bank of keys with which the instant machine is equipped.

Referring again to Fig. 13, during machine operations the depressed amount keys 83 are locked against releasing and the amount keys not depressed are locked against depression by detents 120 slidably mounted on the studs 100 and having hooks 121 which cooperate with the studs 97 carried by the keys 83. Each lower end of the detent 120 has fast therein a stud 122 embraced by a slot in a locking arm 123 loose on the shaft 104. The arm 123 has a surface 124 which cooperates with the rounded edge of a bail 125 loosely mounted on the shaft 116 by means of arms 126 and 127 (see also Fig. 19). As described in detail below, when the machine is released for operation, the bail 125 is rocked to engage the surfaces 124 of the arms 123 to rock the said arms 123 clockwise to move the hooks 121 of the detents 120 into position to lock the depressed keys in their depressed position, and to lock the undepressed keys in their undepressed positions.

Machine releasing and clutch mechanisms

The bail 125 is connected to an arm 128 by a bail 135, (Figs. 2 and 19). This arm 128 is bifurcated to embrace a stud 129 (Fig. 2) in a link 130 mounted for slight vertical movement on studs 131 and 132 carried by the right frame 70. The link 130 has a right-angled projection 133, which normally rests on a release pawl 134 loose on the stud 131 and normally retained in engagement with a stud 135 in a release plate 140 by a spring 141. The plate 140 is mounted for slight diagonal movement on studs 142 and 143 secured in the right frame 70. The starting bar 90 is detachably mounted on the plate 140 by means of studs 144, which are straddled by the bifurcated stem of said starting bar 90. Loose on the stud 131 is a non-repeat pawl 145 normally maintained in engagement with an ear 146 of the pawl 134 by a spring 147, which forms a flexible connection between said pawls 134 and 145. The lower end of the link 130 is connected in the usual way to a switch lock lever 148 rotatably supported on a rod 149 extending between right-angled projections 150 and 151 of the frame 70.

Depressing the starting bar 90 (Fig. 2) rocks the pawl 134 clockwise, thereby disengaging it from the projection 133. The link 130 is then free to move downwardly under tension of a spring (not shown). Downward movement of the link 130 through the stud 129 rocks the arm 128 and bail 125 (Fig. 13) clockwise, causing the rounded edge of the bail to engage the surfaces 124 of the arms 123 and rock said arms counter-clockwise. This forces the locking detent 120 upwardly or clockwise, causing the hooks 121 to hook over the flat portion of the studs 97 of the depressed keys and slide under the studs 97 of the keys not depressed. This locks the depressed keys against releasing and prevents depression of other keys during machine operations.

Downward movement of the link 130 (Fig. 2) moves the lever 148 out of engagement with the driven member of the clutch, thereby allowing the driven member to be automatically coupled to the driving member in the usual way and simultaneously closes the switch that supplies the electrical current to the motor. Near the end of machine operation mechanism not shown restores the lever 148 and the link 130 upwardly to their normal positions. The spring 141 restores the pawl 134 into the path of the projection 133 and simultaneously restores the starting bar 90 to its normal position. This upward movement of the link 130 returns the bail 125 counterclockwise, thereby allowing each arm 123 (Fig. 13) and the detent 120 to be returned to home position by means of a spring 152. In order to insure the detent 120 and the arm 123 being restored to their normal positions the arm 103 (Fig. 13) when it makes its initial releasing movement engages a stud 153 carried by the arm 123 to positively restore the detent 120, which due to friction or binding may not be fully restored by the spring 152.

The mechanism that restores the link 130 upward, lifts the lower surface of the projection 133 slightly above the plane of the pawl 134 thereby insuring the restoring of said pawl 134 in the path of said projection 133. After the pawl 134 is restored, the mechanism that returns the lever 148 and the link 130 moves to a neutral position allowing the projection 133 to come to rest on the pawl 134.

The upper end of the non-repeat pawl 145 extends slightly above the corresponding portion of the release pawl 134. Consequently depressing the starting bar 90 causes the spring 147 to rock the pawl 145 clockwise until stopped by the upper end thereof engaging the front or left hand (Fig. 2) edge of the projection 133. Continued movement of the pawl 134 flexes the spring 147. In case the operator's hand is carelessly left upon the starting bar 90 at the completion of machine operation, the pawl 134 would not be restored in the path of the projection 133. This would allow the machine to make a repeat operation were it not for the fact that the pawl 145 is rocked clockwise by the spring 147 into the path of the projection 133 when the link 130 is restored upward as explained above. This effectively blocks the downward movement of the link 130 until the pressure on the starting bar 90 is removed.

The spring 141 then returns the pawl 134 counterclockwise, causing the ear 146 to engage and rock the pawl 145 counterclockwise beyond the projection 133.

The above description of the releasing and the clutch mechanism is deemed sufficient as these mechanisms are old, having been used in former machines of this type, reference being had to the above mentioned Robertson patent and applications for a full disclosure and complete description of these mechanisms.

*Starting bar locking mechanism*

Means are provided in machines of this type for locking the starting bar 90 against depression when it is desired to prevent operation of the machine. The plunger of a lock, not shown, secured to the cabinet 76 controls a lever 154 loose on a stud 155 carried by the frame 70. The lever 154 has a stud 156 arranged to cooperate with an extension 157 of the pawl 134. Turning the key to the lock in one direction releases the lever 154 and allows it to be rocked counterclockwise by a spring 158 to move the stud 156 into the path of the extension 157 thereby preventing clockwise releasing movement of the pawl 134. Turning the key to the lock in the opposite direction causes this plunger to engage the lever 154 and rock it clockwise to remove the stud 156 from the path of the extension 157.

*Manual key releasing mechanism*

Figure 1:
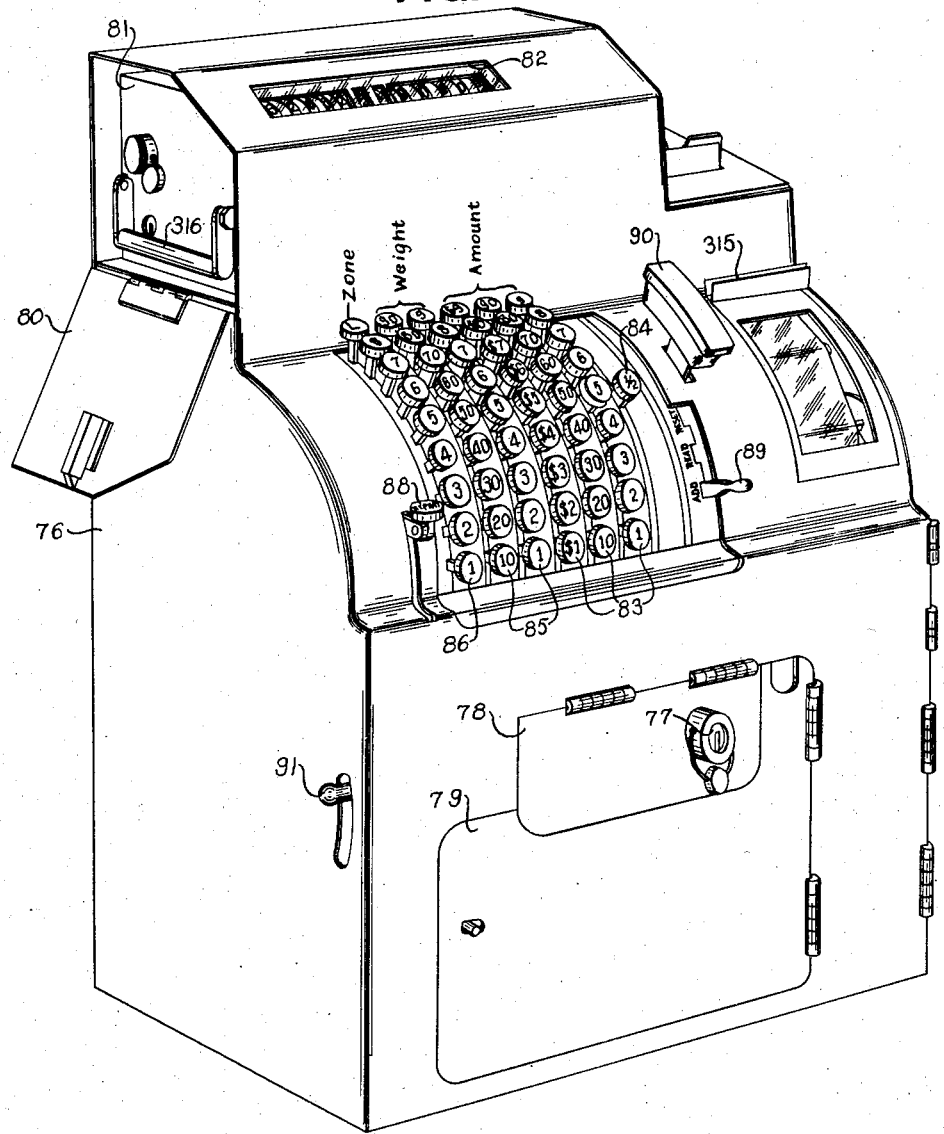
Fig. 1 is a perspective view of the complete machine.

Directing attention to Figs. 1 and 9, the knob 91 which protrudes through an opening in the cabinet 76 is secured to a release lever 159 having fast therein a stud 160 journaled in a hub 161 secured in the left frame 71. An upward extension 162 of the lever 159 is arranged to engage a stud 163 carried by the arm 105. The lever 159 has an arm 164 which cooperates with a stud 165 in a yoke 166 loose on a shaft 167 opposite ends of which are journaled in the main frames 70 and 71. Rocking the lever 159 counterclockwise as observed in Fig. 9, by means of the knob 91 causes the extension 162 to engage the stud 163 to rock the arm 165 and the shaft 104 and arms 103 (Fig. 13) clockwise, which in turn moves the flexible detent 99 counterclockwise to release any depressed key. Rocking the lever 159 counterclockwise also causes the arm 164 to engage the stud 165 to rock the yoke 166 clockwise, causing an extension 168 thereof to engage and lift the switch lock lever 148 (Fig. 2) to restore said switch lock lever when it has been partially released.

*Differential mechanism*

The differential mechanism used in this machine is similar to that disclosed in Robertson's patent and co-pending patent applications referred to at the beginning of this specification; therefore it is thought that a brief description of this mechanism will be sufficient for the purpose of this specification. The differential mechanism is best shown in Figs. 13, 14, and 15.

Secured in the plate 94 of the amount key bank 92 is a stud 169 having loosely mounted thereon a zero stop pawl 170 with a right-angled ear 171 which cooperates with an extension 172 of an amount differential actuator 173 rotatably supported by a shaft 174 journaled in the main frames 70 and 71. A spring 175 is tensioned to urge the pawl 170 counterclockwise to maintain a projection 176 thereon in contact with a stud 177 fast in the flexible detent 99.

In adding operations when no key is depressed the zero stop pawl 170 retains the differential actuator 173 in zero position. Depressing one of the keys 83 shifts the detent 99 downwardly causing the stud 177 to rock the pawl 170 clockwise out of the path of the extension 172 of the actuator 173. The actuator is then free to move clockwise until the extension 172 engages the stem of the depressed amount key. When the depressed amount key is released the spring 175 returns the zero stop pawl 170 to its effective position in the path of the extension 172 as shown in Fig. 13. It will be remembered that the amount bank 92 is representative of all the banks of keys in the instant machine, as their structure is practically identical.

Each amount actuator 173 has adjacent thereto a printer segment 178 loose on the shaft 174 and having a plurality of teeth which engage similar teeth in printer operating pinions 179 rotatably supported by a printer shaft 180, one end of which is journaled in the left frame 71 the other end being journaled in right printer frame 294 Fig. 5. The gears 179 through a plurality of telescoping tubes 181 and the shaft 180 position type carriers commensurate with the keys depressed for the printing of various data upon the detail strip, the postage label and the insertable reading slip (Figs. 6, 7 and 8).

Directing attention to Figs. 13 and 15, the actuators 173 and the segments 178 have openings through which extends a universal rod 182 supported by arms 183 and 184 secured to the rock shaft 174. Secured on the shaft 174 (Fig. 10) is a disk 185 having a plurality of teeth which mesh with similar teeth in a cam arm 186 loose on a stud 187 carried by the left frame 71. The arm 186 carries two rollers 188 which cooperate with companion cams 189 and 190 secured to the main drive shaft 111. The main drive shaft 111 makes one complete counter clockwise revolution for each machine operation. This rocks the arm 186 first counter clockwise and then back to normal position, which in turn rocks the shaft 174 and universal rod 182 first clockwise and then back to normal position as shown in Fig. 10. The extent of movement of the shaft 182 is accurately controlled by means of a stud 191 in the left frame 71 which is contacted by surfaces 192 and 193 of the arm 183 at the terminus of the movements of said arm in either direction.

Corresponding actuators 173 and printer segments 178 are at times coupled together by pinions 194 (Fig. 13) which cooperate with teeth in said actuators and segments. The pinions 194 are loose on a rod 195 rigidly supported by arms 196 (see also Fig. 15) and 197 secured to a shaft 198 journaled in the frames 70 and 71. Referring to Fig. 9, the left end of the shaft 198 has secured thereon an arm 199 with a stud 200 which cooperates with a recess in a link 201 the lower end of which is pivotally connected to an arm 202 secured on the shaft 167. The upper end of the link 201 carries a stud 203 which extends within a slot 204 in the repeat key 88 which is journaled on the rock shaft 174. Secured on the right hand end of the shaft 167 (Fig. 2) is a reset cam arm 205 carrying a roller 206 which extends within a raceway in a reset cam 207 secured on the shaft 111.

In adding operations depression of one of the keys 83 (Fig. 13) rocks the zero stop pawl to ineffective position and moves the key stem into the path of the extension 172 of the actuator 173. Initial movement of the shaft 111 (Fig. 2) through the cam 207 rocks the arm 205, shaft 167 and arm 202 (Fig. 9) first clockwise. The link 201 guided by the slot 204 rocks the arm 199, shaft 198 and rod 195 counter clockwise to disengage the pinions 194 from the actuators 173 and segments 178 (see also Fig. 13). The pinions 194 are moved into engagement with an alining bar 208 secured to the back frame 72. Next, the universal rod 182 starts its initial movement clockwise and the differential actuators 173 are urged to follow said rod by a spring 209 until stopped by the stems of the depressed keys 83. The universal rod continues or rather completes its cycle of movement clockwise, restoring all the printer segments 178 to zero. Next the pinions 194 are returned clockwise to couple the corresponding actuators 173 and segments 178 together, after which the main totalizer wheels 210 loose on a rod 211 are engaged with the teeth of the segments 173. The universal rod 182 then starts its return movement counter clockwise, picking up all the actuators 173 and returning them to their zero positions. This rotates the main totalizer wheels 210 clockwise commensurate with the amount set up on the keyboard. Due to the fact that they are coupled together the printer segments 178 receive the same movements as their associated companion actuators 173, which through the gears 179 and the tubes 181 position the type carriers (not shown) commensurate with the amount on the keyboard. Immediately after the differential actuators 173 arrive at home position, the depressed keys 83 are released, restoring the zero stop pawls 170 to their effective positions and the main totalizer wheels 210 are disengaged from the teeth of the actuators 173.

The rod 211, Fig. 2, is connected by a pair of arms 212, only one here shown, secured to a shaft 213 journaled in the main frames 70 and 71. Secured on the shaft 213 is an arm 214 having pivoted thereto a link 215 with a stud 216 embraced by the bifurcated end of a shifting lever 217 loose on a stud 218 carried by the right frame 70. The lever 217 has a slot 219 through which extends a stud 220 carried by the total control lever 89. The link 215 has a stud 221 which cooperates with a notch 222 in a right-angled projection of an add engaging arm 223, and a notch 224 in a similar projection of a read engaging arm 225, and a notch 223 in the reset arm 285, both of said arms 224 and 225 being rotatably supported by the shaft 167. The add arm 223 (Fig. 4) carries a roller 230 which cooperates with a raceway in a cam 231 secured to the shaft 111 and the read arm 225 (Fig. 3) carries a roller 232 which cooperates with a raceway 233 in the cam 207.

In Fig. 2 the total control lever 89 is shown in add position, in which position the stud 220 cooperating with the slot 219 positions the lever 217 and the link 215 so that the stud 221 is in operative alinement with the slot 222 in the add arm 223 (see also Fig. 4). Consequently the wheels 210 and the main totalizer will be engaged with and disengaged from the actuators 173 in adding time. In adding operations after the universal rod 182 (Fig. 13) has completed its clockwise cycle of movement to set the differential actuators 173 and restore the printing segments 178 to zero, the cam 231 (Figs. 2 and 4) cooperating with the roller 230 rocks the add arm 223 clockwise, which through the link 215 rocks the shaft 213 also clockwise to engage the totalizer wheels 210 with their actuators. Immediately after the ball 182 completes its return movement counter clockwise the cam 213 rocks the arm 223 and the shaft 213 counter clockwise to disengage the totalizer wheels 210 from their actuators.

Main totalizer transfer mechanism

The transfer mechanism employed in the main totalizer of the instant machine is similar to that used in former machines of this type, and therefore, will be but briefly described in this specification. However, reference may be had to the Robertson Patent No. 1,816,263 cited at the beginning of this specification for a full disclosure and complete description of this transfer mechanism.

The main totalizer transfer mechanism is best shown in Fig. 13. When a long tooth 234 of the main totalizer wheel 210 passes through zero it wipes a release pawl 235, which in turn releases a transfer lever 236 to the action of a spring 237 which rocks said lever clockwise to disengage a projection 238 from a like projection on a transfer arm 239. This releases the transfer arm 239 to the action of a spring 240 which urges said arm clockwise causing a transfer pawl 241 carried thereby to engage and rotate the next higher order totalizer wheels 210 one tooth space. The clockwise transferring movement of the transfer arm 239 is restrained until the wheels of the main totalizer are disengaged from their actuators. At the beginning of each machine operation all the knocked-down transfer levers 236 are restored to effective positions. It will be noted by referring to Fig. 1 that the one-half cent key 84 is in the fifth position of the one-half cent key bank. This causes the transfer mechanism for the one cent bank to be tripped every second time the one-half cent key is depressed.

Weight and zone differential mechanism

Calling attention to Fig. 14, the differential actuators for the two rows of weight keys 85 are known as combination differentials, in that they serve a dual purpose. The main totalizer of this machine, in addition to having a wheel for each amount bank, has two overflow wheels, making it possible to accumulate amounts up to $999.99½. These two overflow totalizer wheels occupy positions opposite the two rows of weight keys. The construction of the combination actuators makes it possible to use the two rows of weight keys to control type carries to print the weights of the packages being mailed without interfering in any way with the functioning of the overflow wheels, and in reading and resetting operations the combination actuators cooperate with the overflow wheels to read or reset these wheels in the usual manner. The combination actuators will now be described.

Calling attention to Fig. 14, a combination differential unit includes an actuator 242, one of the printer segments 178 and a total segment 243, all of which are rotatably mounted on the shaft 174. The actuator 242 has an extension 244 which cooperates with the stems of the weight keys 85 in exactly the same manner as the extensions 172 of the amount actuators 173 cooperate with the stems of the amount keys 83. The total segment 243 has pivoted thereto a latch 245 having therein a notch which cooperates with a stud 246 carried by the actuator 242. The latch 245 carries a stud 247 arranged to cooperate with a slot in a latch shifting arm 248 secured on a shaft 249 opposite ends of which are journaled in the frames 70 and 71.

In adding operations the position of the shaft 249 and the arm 248, as shown in Fig. 14, maintains the latch 245 disengaged from the stud 246 and also maintains the stud 247 behind a beveled surface of a side plate 250 of the weight bank. Therefore in adding operations the total segment 243 is locked in the zero position. The actuator 242 differs from the amount actuators 173 in that it has no teeth to cooperate with the main totalizer wheels 210. Therefore in adding operations the actuator 242 cooperates with the printer segment 178 to set the type carriers in exactly the same manner as the amount differential, but has no effect whatever upon the overflow totalizer wheels.

Operation of differential mechanism in totalizing operations

In read and reset operations the positioning of the actuators 173 and 242 is controlled not by the keys but by the totalizer wheels 210. Consequently other means must be employed to rock the zero stop pawls 170 (Figs. 13 and 14) out of the paths of the actuators 173 and 242. This is accomplished by the total control lever 89 (Figs. 2 and 11) which has a stud 251 arranged to cooperate with an arm 252 secured to the shaft 116. Also secured on the shaft 116 is a plurality of release arms 253, one for each bank of keys, each having fast therein a stud 254 arranged to cooperate with the zero stop pawls 170.

Moving the control lever 89 upward to read or reset position causes the stud 251 to rock the arm 252, the shaft 116 and the arm 253, counter-clockwise, causing the studs 254 to engage and rock the zero stop pawls 170 clockwise out of the paths of the actuators 173 and 242 (see also Fig. 14).

To prevent the depression of keys during totalizing operations the arms 253 have right-angled projections 255 which are rocked under extensions 256 of the flexible detents 99 to block said detents against counter clockwise movement, thereby preventing depression of any of the keys.

It is also impossible to move the total control lever out of add position when a key is depressed. Depressing any one of the keys 83 or 85 moves the flexible detent 99 for the bank in which the key was depressed counter clockwise to place a pawl 257 carried by said detent in the path of the projection 255 of the arm 253 thereby blocking the counter clockwise movement of said arm and retaining the total control lever 89 in add position.

By referring to Fig. 2 it will be seen that moving the total control lever 89 to read position through the lever 217 moves the link 215 until the stud 221 is in operative alinement with the notch 224 in the read arm 225 (see also Fig. 3). Rotation of the cam 207 causes the raceway 233, in cooperation with the roller 232, to rock the arm 225 clockwise near the beginning of machine operation. This through the link 215 and arm 214 rocks the shaft 213 clockwise to engage the totalizer wheels 210 with their actuators before the universal rod 182 (Fig. 13) starts its initial movement clockwise. The actuators under spring tension follow the universal rod 182 in its initial movement, rotating the totalizer wheels 210 backward or counter clockwise until said wheels are stopped in zero positions by the long teeth 234 engaging the pawls 235. This positions the actuators commensurate with the amount standing on the main totalizer wheels.

As in adding operations, the coupling pinions 194 are disengaged at the beginning of the totalizing operation and are reengaged after the universal rod 182 has completed its initial movement clockwise to set the actuators according to the amounts on the totalizer wheels and restore the printing segments 178 to zero. Return movement of the universal rod 182 returns the actuators to zero positions and positions the printer segments 178 in accordance with the amount on the totalizer wheels. In reading operations the totalizer wheels 210 remain in mesh with the actuators until said actuators have completed their return movements counter clockwise. This reenters the amount on the totalizer wheels. In reset operations, after the totalizer wheels have been turned back to zero, thereby properly setting the actuators, they are disengaged from said actuators and consequently remain in a cleared condition.

Shifting the total control lever 89 into read or reset position causes a camming surface 258 (Fig. 12) to engage a roller 259 carried by an arm 260 secured on the shaft 249, to rock said shaft clockwise. This in turn rocks the arms 248 (Fig. 14) clockwise, which through the studs 247 engages the latches 245 with the studs 246 to couple the total segments 243 to the actuators 242. The segments 243 have teeth that cooperate with the overflow totalizer wheels in exactly the same manner as the teeth on the amount actuators 173. The latches 245 are maintained in engagement with the studs 246 by an arcuate surface 261 on the plate 250 cooperating with the studs 247. This coupling of the segments 243 and the actuators 242 causes the type carriers for the overflow banks to be set according to the amount on the overflow totalizer wheels. As there is no overflow totalizer wheel opposite the bank of zone keys 86, it is unnecessary to use a combination differential unit for this row of keys. Consequently the regular amount differential unit, including an actuator 173 (Fig. 13) and a printer segment 178, is used for this row of keys.

Differential aliners

There is an alining pawl 262 (Fig. 13) for each differential unit. These pawls are secured on a shaft 263 journaled between right-angled brackets extending from the back frame 72. One of the pawls 262 carries a roller 264 which cooperates with the periphery of a plate cam 265 secured on the shaft 111. The cam 265 cooperating with the roller 264 engages the alining pawls 262 with the teeth of the actuators and the printing segments to aline said actuators and segments at the terminus of their movements in either direction.

Total control lever locking mechanism

The total control lever 89 (Fig. 2) is locked in any one of its three positions during machine operation by means of a stud 266 carried by the arm 126 of the bail 125 cooperating with two recesses 267 and a lower surface 268 of a plate 269 secured to the total control lever 89. It will be recalled that depressing the starting bar releases the bail 125 for clockwise movement. This causes the stud 266 to engage one of the notches 267 or the surface 268 to prevent movement of the total control lever during machine operation.

The total control lever 89 (Fig. 2) is connected by a link 270 to a flange 271 of a tube 272 rotatably supported on the shaft 180 and operatively connected to total type carriers (not shown). Movement of the total control lever positions the total type carriers to print a symbol characteristic of the operation being performed.

Repeat key mechanism

Quite often mail order establishments mail a plurality of packages of identical weight to a common destination. This necessitates the duplication or repeating of the amount, weight and zone for each package, in order to get a postage label therefor. With the repeat mechanism embodied in the instant machine, it is necessary to make only one setting of the keyboard, after which the amount, weight and zone, or in other words, the immediately preceding operation may be duplicated as many times as desired by using the repeat key. The repeat mechanism will now be described in detail.

Calling attention to Figs. 9, 11 and 12, the repeat key 88 is rotatably supported by the shaft 174 and is urged clockwise against a stop stud 274 secured in the frame 71 by a spring 273. Another stud 275 secured in the frame 71 limits the downward or counter clockwise movement of the repeat key 88. Fast in the repeat key 88 are half-round studs 276 and 277 which cooperate respectively with slots 278 and 279 in the arm 115 and in an arm 280 the latter secured on the shaft 249.

Depressing the release key 88 causes the stud 276 in cooperation with the slot 278 to rock the arm 115, the shaft 116, and the arms 253 counter clockwise to move the zero stop pawls 170 to ineffective positions, and to place the projections 255 of the arms 253 in the paths of the extensions 256 of the flexible detents 99. This is to prevent depression of keys and to release the actuators 173 and 242 to the control of the printer segments 178.

It will be recalled that the flexible detents 99 are moved downwardly near the end of machine operation to release the depressed keys. In repeat operations, due to the fact that the arms 253 block the downward movement of the detent 99, it is necessary to disable the key releasing mechanism. Consequently the counter clockwise movement of the arm 115 through the link 114 (Fig. 9) rocks the pitman 110 downwardly disengaging the notch therein from the stud 109 in the lever 107.

Depressing the release key 88 causes a notch 281 therein to embrace the stud 200 in the arm 199 and simultaneously rock the link 201 clockwise to disengage its recess from the stud 200 to lock the coupling pinions 194 in engagement with the actuators 173 and 242 and their corresponding printer segments 178. Depressing the release key 88 causes the stud 277 to engage the slot 279 to rock the arm 280 and the shaft 249 a slight distance counter clockwise, causing a stud 282 (Figs. 2 and 12) in the arm 260 to engage an extension 283 of the release pawl 134 to rock said release pawl clockwise to release the machine for operation.

It will be recalled that the printer segments 178 (Figs. 13 and 14) remain in set positions at the end of machine operations, and are restored to zero during the first half of the succeeding operation. This, due to the fact that the actuators 173 and 242 remain coupled to the printer segments 178, causes said printer segments 178 when they are returned or restored to zero in repeat operations to position the actuators 173 and 242 exactly as they were positioned in the preceding operation. This makes it possible to repeat a former operation as many times as is desired by simply depressing the repeat key 88.

Calling attention to Figs. 9 and 12, secured on the arm 127 of the bail 125 is an arm 284 having a recess 290 which cooperates with the stud 276 to lock the repeat key 88 in its depressed position during a repeat operation. A radial service 291 of the arm 284 cooperates with the stud 276 to block the clockwise releasing movement of the bail 125 thereby preventing release of the machine by using the starting bar 90 (Fig. 2) when the repeat key 88 is partly depressed.

When the machine is released for operation by using the starting bar 90 the upper end of the arm 284 passes under the stud 276 blocking downward movement thereof to prevent simultaneous depression of the repeat key and the starting bar. By observing Fig. 12 it will be recalled that moving the total control lever 89 out of adding position rocks the arm 260 and the shaft 249 clockwise. This in turn rocks the arm 280 causing an arcuate surface 292 thereon to pass under the flat portion of the stud 277 to block downward movement of the repeat key 88 during totalizing operations.

As this repeat mechanism is fully described and illustrated in the Robertson patent and Robertson applications referred to at the beginning of this specification it is felt unnecessary to further describe this mechanism herein.

It will be recalled by referring to Figs. 2, 9 and 11 that moving the total control lever 89 away from adding position, the stud 251 and arm 252 rocks the shaft 116 and consequently the arm 115 counter clockwise. This disengages the key releasing pitman 110 from the stud 109 carried by the lever 107. This is necessary in totalizing operations, the same as in repeat operations because the projections 255 of the arms 253 prevent releasing movement of the flexible detents 99. This counter clockwise movement of the arm 115 (Fig. 9) causes a radial surface 293 thereon to move under the flat portion of the stud 276 to further block the repeat key 88 against depression during totalizing operations.

*Printing mechanism*

The printing mechanism of this machine is substantially the same as that used in former machines of this type, and disclosed in Robertson's patent and applications previously mentioned above. Fig. 5 is a side elevation of the printing mechanism used in this machine, which mechanism is supported between a right printer frame 294 and a left printer frame 295 connected by various cross rods and studs. The entire printing assembly is in turn secured to the main frame 70.

The gummed web 296 for the postage label forms a supply roll 297 supported on a rotatable sleeve loose on a stud 298 secured in the frame 295. The web 296 is fed upward through a chute 299 between an electro and date cylinder 300 and an impression roll 301; thence between the blades of a severing device and past a plurality of type wheels, indicated by dot and dash lines 302, into an issuing chute 303 from which the severed label (Fig. 7) is partially ejected so that it may easily be removed therefrom by the operator. The chute 302 is so constructed that labels remaining in the chute from previous operations are kicked out by the succeeding label. This eliminates the possibility of labels stacking and jamming in the chute. The electro and date cylinder 300 prints the date and other characters on the postage label while the amount, weight, consecutive number and zone number are printed upon the label by means of a platen 305 carried by a hammer 306, which at the proper time forces the label against the type wheels 302. The electro and date cylinder 300 has feed rails that cooperate with the impression roll 301 to feed the web 296 upward. An ink roll 307 inks the electro and date wheels.

A detail or audit strip 308, a fragment of which is shown in Fig. 6, forms a detail supply roll 309 and is threaded between a plurality of type wheels indicated by dot and dash lines 310 and an impression hammer 311 thence onto a receiving roll 312 which may be wound by hand but is fed one step at each machine operation by a pawl 313 and its operating mechanism. A duplicate record of every transaction is recorded on the audit strip. This provides a means for periodically checking the number of packages mailed, the amount of postage, etc.

A mailing slip 314 (Fig. 8) accompanies each mailing, the information contained on this slip being advantageous to the postal authorities in checking the number of packages received at one time or the number of packages in a particular bunch, and the total amount of postage on these packages. A slip chute 315 (Fig. 1) has a flanged opening to facilitate the insertion of the slip 314. The aperture for inserting the slip is normally locked, but shifting the total control lever 89 to read position unlocks the aperture. The slip 314 is used in the following manner: Prior to the issuing of a number of labels or a certain number of packages or prior to the beginning of a certain business period the operator moves the total control lever 89 to read position, inserts a slip in the slip chute, and takes a reading of the main totalizer. At the end of a run or at the end of a certain business period this procedure is repeated and the difference between the two amounts gives the total postage and the difference between the two consecutive numbers gives the number of packages mailed. A line-finding device provides means for locating the slip so that the two readings will be printed in proper order for subtracting.

The type wheels 302 and 310 are driven by gears (not shown) connected to the righthand end of the nested tubes 181 (Fig. 13). A set of consecutive number type wheels is mounted on each type wheel line. A step-by-step mechanism drives both sets of consecutive number wheels in the usual manner.

The foregoing description of the printing mechanism while brief is deemed sufficient for the present purpose, however for a more complete description reference may be had to the Robertson patent and applications mentioned at the beginning of this specification.

*Postage meter*

In former postage machines of this type the main totalizer, was so arranged that when a predetermined amount had been added thereon the machine was automatically locked against further operation. Before operation of the machine could be resumed it was necessary to deliver the complete machine to the postal authority in charge of the key that controlled this locking mechanism. This was more or less of a cumbersome task, so the idea was conceived whereby a removable postage meter 81 (Fig. 1) was embodied in this machine. The postage meter has two totalizers; one an increasing or adding totalizer that cannot be reset; the other a settable decreasing or subtracting totalizer. The increasing totalizer accumulates positively and the decreasing totalizer accumulates negatively. When a previously set amount on the decreasing settable postage totalizer is exhausted, the machine is automatically locked against further operation. It then becomes necessary for the proprietor or operator who is in possession of a key to the control locking mechanism to unlock the postage meter from the machine proper, and deliver the meter to the proper postal authority who is in possession of a key to the door or closure of the meter cabinet which gives access to the wheels of the decreasing postage totalizer. The wheels of the decreasing totalizer may then be manually positioned to the amount of postage purchased by the proprietor after which the meter may be locked in the machine and operation thereof resumed. A convenient handle 316 (Figs. 1 and 20) is provided for carrying or transporting the meter box from place to place. The mechanism of the postage meter will now be described in detail.

Postage meter frame work

By referring to Fig. 21 it will be seen that the frame work of the postage meter includes a right frame 317 and a left frame 318 connected by a back frame 319 and a front plate 320. An intermediate frame 321 is connected to the back frame 319. The postage totalizers are mounted in a rockable frame consisting of end plates 322 and 323, an intermediate plate 324 and various cross-rods, bars and shafts. The frame 319 and the plate 320 (Fig. 24) carry rollers 325 which cooperate with ways or channels formed by right-angled rails bent on plates 326 and 327 secured to the cross bars 73 and 74 (see also Figs. 13 and 16). The channels thus formed provide a means for properly locating the postage meter within the machine.

To assist in locating and retaining the postage meter 81 in the ways, a pawl 285 (Fig. 44) is provided. The pawl 285 is loosely mounted on an extension 286 of the plate 327 and has an angular nose 287 extending through an opening in the right-angled rail of the plate 326 into one of the channels provided for the rollers 325. A spring 288 urges the pawl 285 counter clockwise which movement is limited, when the meter is removed from the machine, by an extension 289 of the pawl 285 contacting the rail of the plate 326. When the postage meter is inserted in the machine the nose 287 of the pawl 285 rides over one of the rollers 325 thereby properly locating the postage meter in the machine.

Postage totalizers

As previously explained, the postage meter contains two totalizers; one an increasing or accumulator of positive amounts; the other a decreasing or accumulator of negative amounts. These totalizers are very much alike in construction, the chief difference being that the numerals on the reading wheels run in opposite directions. Another difference is that the increasing totalizer uses a novel Geneva gear arrangement for the transferring of amounts in the higher order denominations.

Referring to Figs. 15, 21 and 33, wheels 328 of the decreasing totalizer and wheels 329 and 330 of the increasing totalizer are rotatably mounted on a rod 331. Idler gears 332 loose on a rod 333 connect the wheels of the decreasing totalizer and the four lower denominational wheels of the increasing totalizer with transfer gears 334 loose on a rod 335. In the machine of the instant invention, the transfer gears of the four lower denominations of each totalizer mesh with gears 336 loose on a rod 337. The rods 331, 333, 335 and 337 are supported by the intermediate frame 321 and plates 322 and 323 which, as previously explained form a rockable frame that pivots on a transfer rod 338 supported by the end frames 317 and 318.

A meter bottom plate 340 (Figs. 23, 24 and 25) has slots 341 which coincide with similar slots 342 in a cover plate 343 secured to the bars 73 and 74 when the postage meter is properly placed in the machine. The wheels 336 (Fig. 16) of the decreasing postage totalizer are rocked downwardly through the openings 341 and 342 into engagement with the teeth of segments 344 connected to driving segments 345 by means of studs 346. The segments 344 and 345 are loose on a shaft 347 journaled in the main frames 70 and 71 (see also Fig. 15). The segments 345 (Figs. 13 and 16) have teeth which mesh with the gears 179 for the four amount banks. The movement of the segments 344 (Figs. 13 and 15) is transmitted to driving segments 348 for the increasing totalizer by pinions 349 secured on shafts 350, the righthand ends of which are journaled in the frame 70 and the left ends in a plate 351 secured to the frame 71.

It will be recalled that there are four denominational banks of amount keys from one-half cent to one dollar inclusive. The segments 344 (Fig. 15) for the one-half cent, one cent and 10 cent denominations are geared to their corresponding segments 348 through the pinions 349, there being a pair of these pinions and a shaft 350 for each of these denominations. The segment 345 for the one dollar denomination of the decreasing totalizer and its corresponding segment 348 for the increasing totalizer are secured to the shaft 347 and consequently move in unison.

Postage totalizer engaging mechanism

Directing attention to Figs. 15, 16 and 21, loose on the right end of the rod 338 is a gear segment 373 having a hub 352 which extends through a hole 339 in the plate 317. The hub 352 has therein a clutch cut adapted to receive a tenon 353 of a hub 354 secured to an arm 355 loose on a stud 356 extending between the right frame 70 and a sub-frame 357. This stud 356 is in axial alinement with the rod 338. A link 358 pivotally connects the arm 355 to an arm 359 secured on the right end of a shaft 360 journaled in the frames 70 and 71. Secured on the extreme left end of the shaft 360 is an arm 361 to which is pivoted one end of a beam 362 connected by a link 363 to one arm of a lever 364 rotatably supported by a stud 365 secured in the left frame 71. Another arm of the lever 364 is bifurcated to receive a stud 366 fast in an arm 367 secured to the left end of the shaft 249 (see also Fig. 9).

The beam 362 has a slot which embraces a stud 368 secured in a lever 369 pivoted on the stud 365. The lever 369 carries a pair of rollers 370 which cooperate with companion plate cams 371 and 372 secured to the shaft 111. A gear segment 373 (Figs. 15 and 16) meshes with a pinion 374 secured to a gear 380 loose on a stud 381 secured in the plate 322. The gear 380 meshes with a similar gear 379 secured on a shaft 382 journaled between the plates 322 and 323. Secured on the shaft 382 is a cam 383 which cooperates with a stud 384 and rollers 385 and 387.

The stud 384 is secured in the frame 317. The roller 385 is loose on a stud 386 also secured in the frame 317, and the roller 387 is carried by an arm 388 (Fig. 17) pivoted on a stud 389 extending between the side frame 317 and the back frame 319. A spring 390 normally maintains an extension of the arm 388 in engagement with a shoulder on the stud 386. The arm 388 has an opening 391 which cooperates with a pin 392 secured in the plate 357 (Fig. 18).

When the postage meter is properly inserted in the machine the pin 392 engages the opening 391 to hold the arm 388 immovable in the position shown in Fig. 17. A cap 393 (Fig. 18) is provided for the opening 391 to prevent the insertion of any foreign object through said opening 391 when the postage meter is removed from the machine in an attempt to maladjust the wheels of the postage totalizers or disable the postage meter mechanism.

Referring to Figs. 24 and 25, shields or shutters 377 and 378 are provided for covering the openings 341 and 342 when the postage meter is removed from the machine. These shields are operated by the control lock mechanism in a manner to be later described.

Properly inserting and locking the postage meter 81 in the machine removes the shutters 377 and 378 from the openings 341 and 342 and engages the clutch cut in the hub 352 (Figs. 15 and 16) with the tenons 353 of the hub 354, and as previously stated, causes the pin 392 (Figs. 17 and 18) to hold the arm 388 in effective position.

It will be recalled that the main drive shaft 111 (Fig. 16) makes one complete counterclockwise rotation each machine operation. This through the companion cams 371 and 372 in cooperation with the rollers 370 rocks the lever 369 first counterclockwise and then back to normal position. Movement of the lever 369 through the stud 368 causes the beam 362 to reciprocate toward the front of the machine and then back to the position shown in Fig. 16. This through the arm 361, shaft 360, arm 359 and link 358 rocks the arm 355 and the hub 354 first counterclockwise and then back to normal position.

Due to the fact that the segment 373 is clutched to the arm 355 in the manner described above it moves in unison therewith, and through the pinion 374 and the gear 380 drives the gear 379, the shaft 382 and the cam 383 first counterclockwise and then back to normal position. The cam 383 cooperating with the rollers 385 and 387 rocks the totalizer frame on its pivot rod 338 (see also Fig. 15) causing the gears 336 for the decreasing postage totalizer to be meshed with the segments 344 and the gears 336 for the increasing postage totalizer to be meshed with the segments 348. This rocking of the postage totalizer frame is so timed that the gears 336 are engaged with the segments 344 and 348 immediately after the actuators 173 (Fig. 13) have completed their initial movement clockwise and the printing segments 178 have been returned to zero, as explained earlier herein.

Return movement of the universal rod 182 positions the amount printer segments 178 commensurate with the amount set upon the keyboard, which movement of the printer segments 178 through the train of gears recited above is transmitted to the gears 336; thence by the gears 334 and the idler gears 332, to the wheels 328 and 329 of the postage totalizers. After the increasing and decreasing postage totalizers have been actuated commensurate with the amounts set on the keyboard the arm 355 (Fig. 16) is returned clockwise to home position by the mechanism described above. This through the segment 373, the pinion 374, the idler gears 380 and the gears 379 revolves the engaging cam 383 clockwise to home position to rock the postage totalizer frame clockwise to disengage the gears 336 from the segments 344 and 348.

The configuration of the cam 383 is such that in home position there is quite a bit of lost motion between the roller 385 and the periphery of said cam 383. The stud 384 cooperates with the periphery of the cam 383 at this time to prevent the postage totalizer frame from moving counterclockwise under its own weight when the high portion of the cam 383 in returning passes beyond the roller 385.

From the foregoing explanation it will be seen that the increasing and decreasing postage totalizers are actuated in adding operations by the regular machine differential mechanism. The wheels of the increasing and decreasing totalizers are revolved in the same direction, the difference being that the numerals of the two sets of wheels run in reverse order so that the wheels of the increasing postage totalizer accumulate positively and the wheels of the decreasing totalizer accumulate negatively.

*Means for disabling the postage totalizer engaging mechanism in totalizing operation*

Due to the fact that neither the increasing nor the decreasing postage totalizer is reset it is necessary in totalizing operation to disable the engaging mechanism for these totalizers. It will be recalled by referring to Fig. 12 that moving the total control lever 89 out of adding position causes the camming surface 258 in cooperation with the roller 259 to rock the arm 260 and the shaft 249 clockwise. This also rocks the arm 367 (Fig. 16) clockwise which in turn rocks the lever 364 counterclockwise which through the link 363 moves the beam 362 counterclockwise to disengage the notch in said beam from the stud 368 in the cam lever 369 and at the same time hooks the bifurcated forward end of said beam 362 over a stud 394. Therefore, from the above explanation it will be seen that in reading and resetting operations of the main totalizer the engaging mechanism for the postage totalizers does not function.

*Aliner mechanism for the postage totalizer operating gear segments*

Means are provided for properly alining the segments 345 and 348, Figs. 13 and 15, when the machine is in home position. An alining bar 395 is arranged to cooperate with the teeth of the segments 345 and 348 said bar being secured on the bail of a yoke 396, the arms of which are secured to a shaft 397 journaled in the frames 70 and 71. Secured on the shaft 397 is an arm 398 having a rounded end which cooperates with a notch in an alining pitman 399 the upper end of which is slotted to receive a stud 400 secured in the back frame 72. The lower end of the pitman 399, Figs. 2 and 3, has a right angle extension 401 which is pivotally connected to the totalizer engaging arm 225.

When the machine is at rest the aliner 395 engages the teeth of the segments 345 and 348. The configuration of the race 233 in the cam 207 (Fig. 3) is such that at the beginning of the machine operation the arm 225 is rocked clockwise to move the pitman 399 downwardly which through the arm 398 rocks the shaft 397 and the yoke 396 clockwise (Fig. 13) to disengage the aliner 395 from the teeth of the segments 345 and 348. After the segments 344, 345 and 348 have been properly positioned, return movement counterclockwise of the arm 225 moves the pitman 399 upwardly to rock the alining bar 395 into engagement with the teeth of the segments 345 and 348.

*Transfer mechanism for the postage totalizers*

The transfer mechanism for the different denominations of the decreasing totalizer and for the four lower denominations of the increasing totalizer is practically duplicated in each denominational unit, therefore, it is thought that the description of the transfer mechanism for one denominational unit will be sufficient for the purpose of the instant invention.

When the wheels of the decreasing totalizer are turned from one to zero and the wheels of the increasing totalizer are turned from nine to zero the transfer mechanism for the next higher order denomination is tripped thereby causing one to be added in said next higher denomination. This transferring mechanism is well shown in Figs. 13, 33 to 39 inclusive, and 55. Figs. 33, 34, and 35 depict the mechanism for transferring amounts from the units of cents denomination to the tens of cents denomination. This mechanism will now be described.

Loose on the transfer rod 338 is a transfer arm 402 carrying rollers 403 which cooperate with the periphery of a transfer cam 404 secured on the shaft 382. The transfer arm 402 carries a stud 405 upon which is pivoted a transfer pawl 406 having a tooth 407 which cooperates with the teeth of a ratchet 408 secured to the transfer gear 334 and separated therefrom by a disk 409. The transfer pawl 406 has therein a slot 410 which embraces the rounded upper end of an arm 411 rotatably supported by a stud 412 in the transfer arm 402. The lower end of the arm 411 is bifurcated to embrace a stud 413 in a transfer trip arm 414, see also Fig. 37, loose on a shaft 415 supported by the plates 321, 322 and 323, Fig. 21. The arm 414 has noses 416 and 417 which cooperate respectively with projections 418 and 419 of a transfer cam 420 secured to the transfer gear 334 and separated therefrom by one of the disks 409. A complete transfer gear unit consists of one of the ratchets 408, one of the gears 334 sandwiched between two of the discs 409, these parts being mounted on the hub of one of the tripping cams 420 and secured to said tripping cam in fixed relation thereto by means of pins. A cross sectional view of such a transfer gear unit is shown in Fig. 36.

Directing attention to Figs. 16, 33, 34, and 35, initial movement counterclockwise of the shaft 382 through the cam 404 rocks the transfer arm 402 clockwise to disengage the tooth of the transfer pawl 406 from the teeth of the ratchet 408 as shown in Fig. 34. The totalizer engaging cam 383 (Fig. 16) then rocks the totalizer frame counterclockwise to engage the gears 336 with the actuator segments 344 and 348, the transfer arm 402 (Figs. 33, 34, and 35) moving in unison therewith. If during the actuation of the postage totalizer one of the lower order wheels moves to zero, the transfer mechanism for the next higher order denomination is tripped so that one will be added in this denomination. For example in Fig. 33 the units of cents transfer cam 420 for the decreasing postage totalizer is shown in the position it occupies when the numeral one on the units of cents reading wheels 328 registers with the sight opening in the postage meter cabinet.

Depressing the one cent key and operating the machine causes the units of cents wheel 328 to move from one to zero. At the same time the tens of cents transfer cam 420 moves one step counterclockwise causing the projection 418 to wipe the nose 416 of the transfer arm 414 to rock said arm counterclockwise (see also Fig. 37). This through the stud 413 rocks the arm 411 clockwise which in turn rocks the transfer pawl 406 counterclockwise thereby lowering its tooth 407 into the position shown in Fig. 37, in the path of the ratchet 408. Return movement clockwise of the shaft 382 first disengages the postage totalizers from their actuators then as the return movement of the shaft 382 continues the cam 404 rocks the transfer arm 402 counterclockwise to normal position. In this instance the transfer pawl 406 of the ten cent bank has been lowered into the path of the ratchet 408 consequently when the transfer arm 402 for the ten cent bank is returned counterclockwise the pawl 406 advances the ratchet 408 one increment of movement to add one in the ten cent denomination. In this case the addition of one in the decreasing postage totalizer will be understood to mean the addition of a negative amount. As the trip pawl 406 advances the ratchet 408 it rides upwardly on the tooth of said ratchet and is consequently restored clockwise to normal position. This through the arm 411 restores the trip arm 414 to its untripped position as shown in Fig. 33.

Secured in the arm 402 is a stud 421, which extends through a hole in the trip pawl 406, to limit the movement of said pawl. This causes the tooth 407 of said trip pawl to lock the ratchet 408 against movement when the totalizer is in normal position, that is disengaged from its actuators. The rearward end of the trip pawl 406 is pointed to cooperate with two notches in a retaining pawl 422 pivotally supported by the transfer arm 402. A spring 436 urges the pawl 422 clockwise to maintain the notches in communication with the trip pawl 406 to retain said trip pawl in either of its positions. Retrograde movement of the ratchet 408 is prevented when the postage totalizer is in engagement with its actuator by means of a retaining pawl 423 loose on the shaft 337 which is held in contact with the ratchet 408 by a spring 424 stretched between the pawl 423 and a rod 425 supported by the plates 322, 323 and 324, Figs. 21 and 22, and a bracket 435 supported by a plurality of the rods and shafts of the rockable totalizer frame.

Quite often upon fast operations of the machine when the gear 334 is operated through several steps of movements, for example let us say from position 8 to position 1, it is possible due to the lost motion existing in the train of gears that drives said gear 334 to overthrow the transfer cam 420 carried by this gear sufficiently to cause the projection 418 Fig. 37 to engage the nose 416 and rock the arm 414 counterclockwise sufficiently to trip the transfer mechanism for the next higher order denomination. However, this overthrow movement is not sufficient to move the ratchet 408 a complete step. Subsequent engagement of the aliner 395 (Fig. 13) with the teeth of the segments 345 and 348 returns the ratchet 408 to its proper position causing the projection 419 of the tripping cam 420 to engage the nose 417 of the tripping arm 414 to restore the trip pawl 406 to its untripped position thus preventing overthrow in the totalizer.

Secured to the transfer arm 402 (Fig. 38) for the units of cents denomination in both the increasing and decreasing totalizers is an arm 426 having a tooth 427 which cooperates with the teeth of the ratchet 408 for the one-half cent denominations. As there are no transfer pawls for the one-half cent denominations the arms 426 are provided for locking the wheels of these denominations against movements when the postage totalizers are disengaged from the actuators. The arms 426 being secured to the transfer arms 402 move in unison therewith and consequently work in exactly the same manner and at the same time as the transfer pawls 406.

It will be noted by observing Figs. 34 and 35 that the cams 404 are arranged in progressive order on the shaft 382. This is necessary in positively actuated transfer mechanisms of this type, as the transfer must be completed in the lower order ahead of the next higher order to allow sufficient time for the next higher order transfer pawl to be tripped before it starts its actuating movement.

Due to the fact that the cams 404, Figs. 38 and 39, are arranged in progressive order on the shaft 382 it is necessary in order to properly position the transfer arms 402 for the one cent, one hundred dollars, and one thousand dollars denominations for the decreasing postage totalizer to provide auxiliary rollers 428 and 429 for cooperating with the periphery of said cams 404 of these denominations.

When the decreasing totalizer is out of mesh or in home position the high part of the cam 404 is beyond the roller 403 in the arm 402 for the one cent denomination, therefore, to properly position said arm 402 at this time so that the pawl 406 will engage the teeth of the ratchet 408 of the one cent denomination and the tooth 427 of the arm 426 will engage the ratchet 408 for the one-half cent denomination it is necessary to provide the auxiliary roller 428 for preventing lost motion between the rollers 403 and the cam 404. Likewise in the one hundred dollar and one thousand dollar denominations when the decreasing totalizer is engaged with its actuators the roller 429 cooperates with the periphery of the cams 404 of these denominations to prevent excessive lost motion in the arms 402 which would likely allow the transfer pawls 406 of these denominations to stumble on the teeth of the ratchets 408 and would also interfere with the tripping of the transfer pawls for these denominations.

*Geneva gear transfer mechanism*

The four higher denominations of the increasing postage totalizer are used for storage purposes only and consequently no actuator segments are provided for these denominations. Amounts are transferred to these four higher denomination wheels by means of a novel Geneva gear arrangement which is best shown in Figs. 15 and 55 and will now be described in detail.

The gear 334 for the one dollar denomination of the increasing totalizer has secured thereto a Geneva disk 430 having an annular rim 431 which cooperates with lug like extensions 432 of the teeth of an intermediate gear 433 loose on the shaft 333. The rim 430 has an opening 434 opposite which is a transfer tooth 440 which cooperates with the teeth of the gear 433. Normally the rim 431 of the disk 430 locks the gear 433 against movement by engaging two of the lugs 432 on said gear.

When the gear 334 for the units of dollars denomination advances from nine to zero the transfer tooth 440 engages the gear 433 to rotate said gear 433 one step to add one in the tens of dollars denomination. The opening 434 is arranged in relation to the tooth 440 so that clearance is provided for the lugs 432, consequently the gear 433 is free to be rotated by the transfer tooth 440 at this time. Similar Geneva gear transfer units are used in the other higher denominations of the increasing postage totalizer.

*Meter and machine locking mechanism*

As previously stated, precautionary measures have been taken to prevent tampering with the meter or mechanism of the machine proper both when the postage meter is attached to the machine and when it is removed therefrom. These measures include a control lock for locking the meter to the machine, a lock to the closure that gives access to the wheels of the resettable decreasing postage totalizer, a sequence control between the control lock and the closure lock, mechanism operated by the control lock that prevents releasing of the machine when the meter is removed therefrom and mechanism that enforces release of the transfer pawls of the decreasing totalizer before the closure lock can be operated.

It is not the intention to confine the above meter and machine locking mechanism to the embodiment shown and described herein as there are many ways in which locking mechanisms such as these may be used to advantage, for example, in any type of cash register where a removable totalizer is employed. Such a machine is adaptable to most any kind of business where individual or departmental records are kept and receipts or tickets issued and also where different shifts of employees use the same machine as in restaurants, hotels, telegraph offices, transportation ticket offices, etc.

Another advantageous use of the locking mechanism of this invention is in any kind of coin receiving machine where a locked receptacle comparable to the meter of the instant machine is provided for coins. This includes fare boxes on carriers, toll telephone coin boxes, vending and weighing machine coin boxes, and in fact any type or kind of device that has incorporated therein a receptacle for money.

*Control locking mechanism*

The meter and machine locking mechanism will now be described in detail. The control lock is partially embodied in the machine and partially in the postage meter. There is a series of main plungers in the machine proper that lock the meter to the machine and a corresponding series of main plungers in the meter which engage a series of openings in the machine proper to further lock the meter to the machine. These plungers are operated by a series of cams which are in turn operated by turning the key to the control lock. A series of disks in both the machine and the meter have lugs that cooperate with openings in auxiliary spring plungers that are operated by the main plungers. These lugs prevent rotation of the control lock shaft when the meter is removed from the machine and removing the meter from the machine further locks the control lock shaft against rotation. Figs. 45 to 51 inclusive illustrate the control locking mechanism.

Directing specific attention to Figs. 19, 50, and 51, journaled in the plates 351 and 357 is a shaft 441 having secured thereon a plurality of cams 442 the peripheries of which cooperate with studs 443 in plungers 444 opposite ends of which are vertically supported in notches 445 in a U-shaped bracket 446 secured to the cross bar 73. The upper ends 447 of the plungers 444 cooperate with the lower ends of spring plungers 448 said lower ends being slidably supported in slots in a bracket 449 secured to a U-shaped bracket 450 in turn secured to the back frame 319 of the postage meter. Right angle extensions 452 of the spring plungers 448 have notches 453 which cooperate with lugs 454 on a series of disks 455 secured to a shaft 456 journaled in the frames 317 and 318 of the postage meter, see also Fig. 21. Springs 457 are tensioned to urge the spring plungers 448 downwardly.

Referring to Fig. 21, secured on the right-hand end of the shaft 456 is a hub 458 having a clutch cut 459 adapted to receive tenons 460 (Figs. 45 and 46) of a hub 461 loose on a stud 462 secured in the right frame 70. Secured to the hub 461 is a gear 463 operatively connected by an idler gear 464, loose on a stud 465 carried by the plate 357, to a gear 466 secured on the right-hand end of the shaft 441. Secured on the shaft 456 (Figs. 19 and 50) is a plurality of cams 467 similar to the cams 442 the peripheries of said cams 467 cooperating with studs 468 in plungers 469 similar to the plungers 444 and vertically supported by slots in the U-shaped bracket 450 (Fig. 51). The lower ends of the plungers 469 cooperate with auxiliary spring plungers 470 vertically supported by the U bracket 446 and having right-angled extensions 471 with slots which cooperate with lugs 472 in disks 473 similar to the disks 455, said disks 473 being secured on the shaft 441. The left-hand end of the shaft 456 (Fig. 50) has secured thereon a bushing 474 having a clutch cut adapted to receive tenons 475 of a control key 476.

Due to mechanism to be later explained, it is impossible to attach the meter to the machine unless the shafts 456 and 441, Figs. 46, 50, and 51, are located in proper relation to each other. This is necessary as the configuration of each of the cams 442 and 467 must agree with the radial location of the lugs 454 and 472 on corresponding disks 455 and 473 in order that the movements of the plungers 448 and 470 will be synchronized with the movements of their respective disks in order that the lugs 454 and 472 on said disks will pass through the openings in said plungers 448 and 470.

In Figs. 50 and 51 the meter is shown locked in the machine. As a specific example let us assume that it is desired to remove the meter from the machine. By means of the key 476 the shaft 456, Fig. 51, and through the gears 463, 464, and 466, Fig. 46, the shaft 441 is rotated counter-clockwise 180 degrees of movement. This in turn revolves the cam 442 which moves the plunger 444 up and down according to the configuration of said cam 442 and as the plunger 448 is maintained in contact with the plunger 444 by the springs 457 it obviously moves up and down in unison with said plunger 444. This synchronizes the movement of the plunger 448 and the disk 455 so that the lugs 454 which as previously stated are located radially in relation to the configuration of the cam 442 will pass through the slot 453 in said plunger 448.

When the postage meter is locked in the machine the upper end of the plunger 444 extends through one of the slotted openings in the U-shaped bracket 450 as shown in Fig. 51. Revolving the shaft 441 counter clockwise 180 degrees moves the plunger 444 downwardly disengaging its upper end from the postage meter (see Fig. 51A) and allowing the spring plunger 448 to come to rest on a shoulder 477 which engages the bracket 449. It is now possible to remove the meter from the machine.

It is thought that the above explanation of one plunger unit will suffice as all the plunger units operate in a similar manner. In the instant embodiment there are two sets of plunger units each set consisting of four plunger units, however the number of sets and the number of units in the set may be varied to meet different conditions. Likewise the configuration of the cams 442 and 446 and the location of the lugs on the disks 455 and 473 may be arranged in various combinations to meet different requirements.

*Control lock escapement mechanism*

Directing attention to Figs. 26, 27, and 49, after the shaft 456 has been turned counterclockwise 180 degrees to unlock the meter from the machine, further movement of this shaft is impossible until the lock for moving the shields 377 and 378 (see also Figs. 24 and 25) to their closed positions, has been operated through its complete cycle of movement. Operating the closure lock releases the shaft 456 for 360 degrees of movement, 180 degrees of this movement being required to lock the meter in the machine and the other 180 degrees of movement being required to unlock the meter from the machine. An escapement device has been provided for blocking the movement of the shaft 456 after it has been turned 180 degrees to lock the meter in the machine. Such mechanism will now be described.

Secured on the bushing 474 (Fig. 26) carried by the shaft 456 is a gear 478 which meshes with an idler gear 479 loose on a stud 480 secured in the plate 318. The gear 479 carries studs 481 and 482 which cooperate respectively with extensions 483 and 484 of an escapement pawl 485 rotatably mounted on a stud 486 carried by the plate 318. A spring 487 is tensioned to urge the pawl 485 in a clockwise direction. Retrograde movement of the shaft 456 is prevented by a pawl 488 which cooperates with the gear 479, said pawl being loose on a stud 489 fast in the plate 318. The pawl 488 is retained in engagement with the gear 479 and against a stop stud 490 by a spring 491. The stop stud 490 prevents the pawl 488 meshing too deeply with the teeth of the gear 479 to allow slight retrograde movement of said gear for a purpose presently to be described.

Turning the shaft 456, by means of the key 476, 180 degrees counterclockwise to lock the meter in the machine causes the stud 481 to engage an inside surface 492 of the extension 485 to rock the escapement pawl 485 counterclockwise thereby placing the extension 484 in the path of the stud 482 to block the movement of the shaft 456 after it has received 180 degrees of movement. Before the shaft 456 can be revolved another 180 degrees to unlock the meter from the machine, it is necessary to give said shaft 456 a slight retrograde movement to rotate the gear 479 a slight distance counterclockwise to disengage the stud 482 from a projection 493 of the extension 484. At the same time the stud 481 engages a projection 494 of the extension 483 to assist in disengaging the projection 493 from the stud 482. This releases the pawl 485 to the action of the spring 487 which rocks said pawl clockwise until the projection 494 engages a shoulder 495 of the stud 480.

The escapement device just described functions only when locking the meter in the machine. Mechanism later to be described which is controlled by the closure lock blocks the movement of the shaft 456 after it has been turned 180 degrees to unlock the meter from the machine. By referring to Fig. 27, it will be seen that the stud 482 does not lie in the plane of the extension 483, consequently during the unlocking movement of the shaft 456 and the gear 479 the escapement pawl 485 remains ineffective.

Fast in the plate 351, Figs. 45 and 46, is a stud 496 upon which is pivoted a locating pawl 497 with a tooth 498 which cooperates with diametrically opposed locating notches in a flange of the bushing 461, Figs. 45 and 46. A spring 499 is tensioned to urge the pawl 497 counterclockwise causing the tooth 498 to engage the diametrically opposed notches in the bushing 461 to aline the shafts 441 and 456, see also Fig. 26, in either their locked or unlocked positions. The pawl 497 also retains the tenon 460 of the bushing 461 in alinement with the clutch cut 459 (Fig. 21) in the hub 458.

Machine release locking mechanism

Turning the control lock to unlocked position renders the machine releasing mechanism ineffective. This is accomplished by mechanism shown in Figs. 19, 47, and 48 and now to be described.

The shaft 441, Fig. 47, has secured thereon a disk 500 having a recess 501 which is adapted to cooperate with the upper end of a pitman 502 having a slot through which extends a stud 503 secured in the plate 351, Fig. 19. The lower end of the pitman 502 is pivoted to a lever 504 loose on a stud 505 secured in the left frame 71. The forward end of the lever 504 is bifurcated to embrace a stud 506 in an extension 507 of the arm 284, see also Fig. 12.

When the postage meter is locked in the machine, the disk 500 is positioned as shown in Fig. 47 with the recess 501 opposite the end of the pitman 502. It will be recalled that releasing the machine for operation by depressing the starting bar rocks the bail 125 and the arm 284 clockwise. This in turn rocks the lever 504 counterclockwise moving the pitman 502 upwardly causing its upper end to enter the recess 501.

Slightest movement counterclockwise of the shaft 441 to unlock the meter from the machine moves the recess 501 out of alinement with the upper end of the pitman which causes the periphery of said disk 500 to block the upward movement of said pitman 502 which in turn blocks the releasing movement clockwise of the bail 125 and the arm 284, thereby preventing release of the machine until the control lock is turned through its complete cycle of 360 degrees or until the meter is again properly locked in the machine.

In order to doubly assure the locking of the machine releasing mechanism when the meter is unlocked from the machine, an auxiliary mechanism which is operated by the control lock has been provided for preventing or blocking the clockwise releasing movement of the bail 125 and the arm 284 (Figs. 47 and 48). Secured on the shaft 441 is a cam 508 the periphery of which cooperates with rollers 509 and 510 carried by a cam arm 511 loose on a stud 512 fast in the plate 351 (see also Fig. 19). A link 513 pivotally connects the arm 511 to an arm 514 secured to a shaft 515 journaled in the frames 70 and 71. The arm 514 has an arcuate surface 516 which cooperates with a projection 517 of the lever 504. An extension 518 of the arm 514 is adapted to be engaged by two notches in a retaining lever 519 rotatably supported on the stud 505. A spring 520 is tensioned to retain the notches in the lever 519 in engagement with the extension 518 of the arm 514.

Initial movement counterclockwise of the shaft 441 to unlock the meter from the machine causes a node 521 of the cam 508 to engage the roller 509 to rock the arm 511 clockwise, which through the link 513 shifts the arm 514 to a position where the arcuate surface 516 blocks the counterclockwise movement of the lever 504, thereby rendering ineffective the machine releasing mechanism. Rotating the shaft 441 180 degrees from the position shown in Fig. 48, to lock the meter in the machine, causes a stud 522 carried by the cam 508 to engage a nose 523 on the arm 511 and rock said arm clockwise to shift the arm 514 (Fig. 47) clockwise to effective position. The stud is located to give the arm 514 an overthrow beyond the position to which it is moved by the node 521. This is to guard against the possibility of the arm 514 being inadvertently or intentionally moved to ineffective position during the period that the meter is removed from the machine. Near the end of the locking movement of the shaft 441 the node 521 (Figs. 47 and 48) engages the roller 510 to rock the arms 511 and 514 counterclockwise to move the arcuate surface 516 out of the path of the projection 517 of the lever 504 and inasmuch as the recess 501 is again alined with the upper end of the pitman 502 the machine releasing mechanism is free to operate. After the machine is released for operation the pitman 502 in cooperation with the recess in the disk 500 locks the shaft 441 against movement thereby preventing operation of the control lock during machine operation.

An undercut portion 524 (Fig. 48) of the cam 508 provides clearance for the roller 510 when the stud 522 engages and rocks the cam arm 511 clockwise.

Means have also been provided for locking the machine against releasing when the amount set on the decreasing postage totalizer has been exhausted. Calling attention to Figs. 19, 47, and 48, secured on the righthand end of the shaft 515 is an arm 530 having therein a stud which extends through a slot 531 in the lower end of a link 532, the upper end of which is pivoted to an arm 533 secured to a hub 534 rotatably mounted on a stud 535 secured in the right frame 70. The hub 534 has tenons 536 similar to the tenons 460 (Fig. 45) on the bushings 461 which protrude through the plate 357 and are adapted to cooperate with a clutch cut 537 (Fig. 21) in a hub 538 secured to a shaft 539 journaled in the frame 317 and plate 321 opposite the stud 535. Secured on the shaft 539 (Figs. 19 and 47) is an arm 540 the forward end of which cooperates with a pawl 541 loose on a rod 542 supported by the plates 322, 323 and 324 (Fig. 21). The pawl 541 cooperates with a tooth 543 on a disk 544 secured to the highest order decreasing postage totalizer wheel 545 (see also Fig. 15). Counterclockwise movement of the pawl 541 is limited by means of a projection 546 which engages a rod 547 supported by the plates 322, 323 and 324 (Fig. 21). This prevents the pawl 541 riding on the periphery of the disk 544 which would hamper the movement of the wheel 545.

As the highest order wheel 545 (Figs. 15 and 47) passes from zero to nine, thereby indicating that the amount set on the decreasing totalizer has been exhausted, the tooth 543 wipes past and rocks the pawl 541 clockwise. This in turn rocks the arm 540, the shaft 539 and the arm 533 clockwise, and by means of the link 532 this clockwise rocking movement is transmitted to the arm 530, the shaft 515 and the arm 514. This moves the arcuate surface 516 on the arm 514 into the path of the projection 517 on the lever 504 thereby preventing releasing of the machine and calling attention of the operator to the fact that the amount on the decreasing postage totalizer has been exhausted.

When the control lock through the cam 508 (Fig. 47) rocks the arm 514, shaft 515, and arm 530 clockwise to prevent release of the machine, this movement of said arm 530, due to the slot 531 in the link 532, is not transmitted to the shaft 539.

Turning the control shaft 456 (Fig. 40) counterclockwise 180 degrees of movement to unlock the meter from the machine places a recess 548 in the flange of the hub 458 opposite a projection 549 on a latch 550 loose on a screw 551 extending between the frame 317 and the back frame 319 of the postage meter. When the meter is properly attached to the machine the pin 392 engages an extension 552 of the latch 550 to retain the projection 549 disengaged from the recess 548. Removing the meter from the machine disengages the pin 392 from the extension 552 thereby releasing the latch 550 to the tension of a spring 553 which rocks the latch 550 counterclockwise thereby engaging the projection 549 with the recess 548 to further lock the shaft 456 against movement when the meter is removed from the machine.

*Shutter operating mechanism*

It will be recalled by referring to Figs. 23, 24 and 25 that the shutters 377 and 378 are provided for closing the openings 341 and 342 in the meter and the machine proper when the meter is unlocked from the machine. These shutters are operated by the control lock mechanism. Unlocking the meter from the machine slides the shutters 377 and 378 over the openings 341 and 342. This is to prevent the insertion of foreign objects through the openings 341 and 342 by unscrupulous persons in an attempt to disable the mechanism of the meter or the machine or to tamper with or maladjust the wheels of the postage totalizer. Locking the postage meter to the machine slides the shutters 377 and 378 away from the openings so that the wheels of the postage totalizers may be engaged with their actuators. The mechanism for operating the shutters will now be described in detail.

Calling attention specifically to Figs. 19, 23, and 25 secured on the righthand end of the control shaft 441 are plate cams 554 and 555 which cooperate respectively with rollers 556 and 557 carried by a cam arm 558 rotatably supported by the shaft 350. The arm 558 carries a stud 559 embraced by a bifurcated extension 560 of an arm 561 of a yoke 562 turnably mounted on the shaft 397. The bail of the yoke 562 connects the arm 561 to a similar arm 563 said arms having in their upper ends studs 564 and 565 which cooperate respectively with slots in right-angled ears 566 and 567 of the shutter 378. The shutter 378 is slidably mounted on the top plate 343 by means of three parallel slots therein through which extend studs 568 secured in the plate 343.

Rotating the control shafts 456 and 441 counterclockwise through 180 degrees of movement to unlock the postage meter from the machine causes the cams 554 and 555 to rock the arm 558 clockwise, Fig. 23. This in turn rocks the yoke 562 and its arms 561 and 563 counterclockwise to slide the shutter 378 forwardly to close the openings 342 in the plate 343.

Secured on opposite ends of the shaft 456 (Figs. 19, 23, and 24) are symmetrical cams 569 the peripheries of which cooperate with rollers 570 in arms 571 and 572 loose on the shaft 338. The arms 571 and 572 each has secured in its upper end a stud 573 which cooperates with a notch in arms 574 and 575 rotatably mounted on studs 576 and 577 secured in the frames 317 and 318. Each arm 574 and 575 has secured in its lower end a stud 578 which cooperate with notches in a pair of upturned ears 579 of the shutter 377 (Figs. 23 and 29). The guard 377 has therein three parallel slots by means of which it is mounted to slide horizontally upon studs 580 secured in the bottom plate of the meter.

Rotating the shaft 456, 180 degrees counterclockwise to unlock the meter from the machine, by means of the cam 569 rocks the arms 571 and 572 counterclockwise which in turn rocks the arms 574 and 575 clockwise to slide the shutter 377 forwardly causing it to cover the openings 341 in the plate 340 to prevent tampering with the mechanism of the postage meter. As the shutter 377 moves forwardly a pair of notches 591 therein engage a pair of studs 581 secured in the plate 340. This gives added support to the forward end of the shutter 377 so that it cannot be sprung out of shape by foreign objects inserted in the openings 341.

*Postage meter closure locking mechanism*

Access may be had to the resettable decreasing totalizer by means of a door or closure 582 (Fig. 20), the wheels of the decreasing totalizer being visible through a glass covered aperture 583 in the closure 582. The closure 582 is normally locked by a closure lock the key for which is in possession of the postal authority having control or supervision of the stamp-issuing machines in a certain locality. The closure 582 is hinged to the cabinet 584 of the postage meter said cabinet being secured to the back frame 319 (Fig. 21) by screws. Studs 585 in the back frame 319 extend through openings in the cabinet 584 and have therein holes adapted to receive the wire of a lead seal 586 which is used to seal the cabinet 584 to the postage meter. This seal provides a means for detecting the removal or any attempt to remove the cabinet 584.

In addition to the seal 586 (Fig. 43) a lock 587 is provided for locking the cabinet 584 to the postage meter. The locking bar 588 of the lock 587 has fast therein a stud 589 which cooperates with a bracket 595 secured to the cabinet 584 of the postage meter. The only time it is necessary to remove the cabinet 584 from the postage meter is when the meter is in need of repair. Therefore, the key to the lock 587 is in possession of the owner or licensor of the machine. As shown in Fig. 43 the cabinet is locked against removal because the only way this cabinet can be removed is by lifting it upwardly and this is prevented by the lock 587 and the seal 586.

The closure lock 590 has a plurality of spring plungers adapted to engage recesses in a barrel 596 (Figs. 27 and 30). Inserting a closure key 597 in a slot in the barrel 596 disengages the plungers from the recesses in said barrel thereby freeing it for rotation. The closure lock key 597 is in the possession of the postal authority whose duty it is to check and reset the decreasing postage totalizer.

As an added precaution to prevent tampering with the closure lock 590 a cap 598 (Figs. 20 and 43) has been provided for sealing the key hole to said closure lock 590. The cap 598 fits over a collar 599 of the cabinet 584. The collar 599 and the cap 598 have therein matched holes adapted to receive the wire of a seal 600. This provides a means of detecting any attempt to tamper with the closure lock.

Secured on the righthand end of the barrel 596 of the closure lock 590 as observed in Fig. 43 and on the lefthand end as observed in Fig. 27 is a gear 601 which meshes with a similar gear 602 secured on a shaft 603 one end of which is journaled in the frame of the closure lock the other end being journaled in the frame 317 (see also Fig. 21). Secured on the righthand end of the shaft 603 (Figs. 42 and 43) is a plate cam 604 the periphery of which cooperates with a pair of rollers 605 carried by an arm 606 rotatably supported by a stud 607 which extends between the frame 317 and the back plate 319 (Fig. 21). The arm 606 has an upward extension to which is loosely connected a locking bar 608 having near its forward end a slot which straddles a stud 609 also extending between the frame 317 and the back plate 319. The locking bar 608 (Fig. 42) has a projection 610 which cooperates with an annular rim 611 of a locking segment 612 secured to the closure 582.

Turning the lock barrel 596 (Fig. 27) 180 degrees of movement by means of the key 597 rotates the shaft 603 (Fig. 42) and the cam 604, 180 degrees clockwise. The cam 604 cooperating with the roller 605 rocks the arm 606 clockwise to withdraw the projection 610 of the bar 608 out of the path of the annular rim 611. The closure 582 may now be opened thus exposing the wheels of the decreasing postage totalizer (see also Fig. 20). As the closure 582 (Fig. 42) is opened the annular rim 611 moves into the path of the projection 610 of the locking bar 608 thereby blocking movement of the arm 606, the shaft 603 and the closure lock 590 while the closure 582 is opened. Opening movement of the closure 582 is limited by means of a projection 613 on the segment 612 which engages the projection 610 of the bar 608 when said closure 582 reaches the terminus of its opening movement.

Directing attention to Figs. 28 and 43, secured on the shaft 603 is a disk 614 having therein a notch which cooperates with the pointed nose of a retaining pawl 615 loosely mounted on the stud 607. A spring 616 urges the pawl 615 counterclockwise causing the pointed nose thereof to engage the notch in the disk 614 when the shaft 603 is rotated clockwise as viewed in Fig. 28 180 degrees of movement by the closure lock 590. This provides a means for determining when the closure lock is in unlocked position.

In order to lock the closure 582 (Figs. 20 and 42) after the wheels of the decreasing postage totalizer have been set to the desired amount it is necessary only to close said closure 582 and turn the closure lock 590 another 180 degrees counterclockwise as viewed in Fig. 26. This rotates the shaft 603 clockwise 180 degrees to move the projection 610 of the bar 608 again into the path of the annular rim 611 thereby locking the closure in its shut position.

Due to a sequence control device that functions in cooperation with the control lock and the closure lock it is impossible to operate the closure lock through more than one complete revolution when the postage meter is removed from the machine. Before the closure lock can again be operated it is necessary to insert the meter in the machine, operate the control lock through one complete cycle, that is, lock the meter in the machine and again unlock it therefrom and remove the meter from the machine. This through the cycle control mechanism presently to be described conditions the closure lock for another complete cycle of operation.

*Transfer pawl release mechanism*

By observing Figs. 33 and 38 it will be seen that before the wheels of the decreasing postage totalizer can be revolved in order to set a new amount thereon it is necessary to release or disengage the transfer pawls 406 and the arm 426 from the ratchets 408. There is an interlocking mechanism between the transfer pawl releasing mechanism and the closure lock 590. This interlock prevents operation of the closure lock until the transfer pawls are disengaged. This mechanism is well shown in Figs. 29 and 31 and will now be described.

A transfer pawl disengaging wrench 617 has tenons 618 adapted to be received by the clutch cut in the hub 352 of the segment 373. Inserting the tenons of the wrench 617 in the clutch cut of the hub 352 and turning said wrench counterclockwise as viewed in Fig. 29, through the segment 373, the pinion 374 and the gear 380, rotates the gear 379 and the shaft 382, 180 degrees counterclockwise. This is the same movement imparted to the shaft 382 when the meter is attached to the machine to engage and disengage the postage totalizers with and from their actuators. However, due to the fact that the meter is removed from the machine the pin 392 (Figs. 16, 17, and 18) is disengaged from the arm 388. Consequently rotation of the shaft 382 at this time does not rock the totalizer frame as explained above, which is due to the fact that the arm 388 is not held stationary but is free to move in unison with the cam 383. However, this initial movement of the shaft 382 (Figs. 33 and 34) by the cam 404 rocks the transfer arms 402 clockwise to the position shown in Fig. 34 thereby disengaging all of the transfer pawls 406 and the arm 426 of the decreasing totalizer from their respective ratchets.

The postage totalizer frame is held immovable when the postage meter is removed from the machine by notches 619 Figs. 23 and 24 in the arms 574 and 575 which engage opposite ends of the rod 425 when the postage meter is unlocked from the machine (see also Fig. 21). Observation of Fig. 32 reveals that the gear 379 has secured therein a stud 620 which cooperates with a pair of studs 621 secured in the plate 322 to limit the rocking movement of the shaft 382. Loosely mounted on the plate 322 is a pawl 622 having a pointed nose 623 urged by a spring 624 into engagement with a pair of diametrically opposed notches in a disk 625 secured to the gear 379. The pawl 622 in cooperation with the notches in the disk 625 locates and retains the shaft 382 at the terminus of its movement in either direction.

Interlock between the transfer pawl mechanism and the closure lock

As previously stated an interlock is provided between the transfer pawl disengaging mechanism and the closure lock to prevent movement of the closure lock until the transfer pawls have been disengaged. This interlock likewise prevents restoring the transfer pawls until the closure lock has been moved through one complete cycle to unlock and relock the closure 582 (Fig. 20). The interlock mentioned above is well shown in Fig. 29 and will now be described.

Secured on the shaft 382 is a disk 626 having a peripheral surface 627 which cooperates with a projection 628 of a lever 629 rotatably supported by a stud 630 secured in the back frame 319. The upper end of the lever 629 carries a roller 631 which cooperates with the periphery of a plate cam 632 secured to the shaft 603. (See also Fig. 43.) The cam 632 is shown in Fig. 29 in the position it occupies when the closure is locked and the mechanism that engages and disengages the transfer pawls is shown in engaging position. With these mechanisms positioned as shown in Fig. 29 an attempt to unlock the closure by turning the key thereto counterclockwise would through the gears 601 and 602 tend to revolve the shaft 603 and cam 632 clockwise. However, due to the fact that the peripheral surface 627 of the disk 626 is opposite the projection 628 of the lever 629 the roller 631 cooperating with the periphery of the cam 632 locks the movement of the shaft 603 thereby preventing the unlocking of the closure 582. (See also Fig. 42.)

Turning the wrench 617 counterclockwise, as viewed in Fig. 29 through the segment 629 and pinion 374 and the gears 380 and 379 revolves the shaft 382 and the disk 626 180 degrees counterclockwise to disengage the transfer pawls from their respective ratchets. This 180-degree movement of the disk 626 moves the radial surface 627 beyond the projection 628 of the lever 629. The closure lock may now be operated as there is nothing to interfere with the clockwise movement imparted to the lever 629 by the cam 632 when said closure lock is operated. Operating the closure lock rocks the projection 628 in the path of the abrupt edge of the radial surface 627 to lock the shaft 382 against return movement until the closure lock 590 has been operated through its complete cycle.

Removal of the wrench 617 from the clutch cut in the hub 352 is impossible when the segment 373 and the hub 352 are out of home position. This is accomplished by means of a stud 633 secured in the transfer wrench 617 which passes through a recess 634 in the hole 339 when said wrench is inserted in the clutch cut of the hub 352. Turning the wrench 617 away from home position moves the stud 633 out of alinement with the recess 634 thereby preventing removal of said wrench 617.

Transfer pawl restoring mechanism

During the setting of a new amount on the wheels of the decreasing postage totalizer it is quite possible that some of the transfer pawls will be tripped. It can readily be seen that were this transfer allowed to take place the true condition of the wheels of the decreasing totalizer would be destroyed. Therefore means have been provided whereby the closure lock in its final movement to lock the closure restores all tripped transfer pawls.

Referring to Figs. 33 and 43, secured on the shaft 603 is a bail 635 which cooperates with the upper ends of arms 636 pivotally mounted on the transfer arms 402. The lower ends of the arms 606 are bifurcated to embrace studs 637 carried by the transfer pawls 406. It will be recalled that when the wheels of the decreasing postage totalizer move from zero to nine the projections 418 of the cams 420 engage and rock the transfer arms 414 counterclockwise, which in turn shifts the transfer pawls 406 counterclockwise to effective positions. The transfer pawls 406 on being tripped rock the arm 636 clockwise moving the upper end thereof into the path of the bail 635. It will be recalled that the shaft 603 is rotated clockwise, as viewed in Fig. 33 by the closure lock, final movement of which causes the bail 635 to engage and rock the arms 636 counterclockwise to restore all tripped transfer pawls 406.

Sequence controlling mechanism

Proper sequence of operation between the closure lock and the control lock is maintained by means of a sequence control mechanism which enforces proper sequence of operation of these locks. Operating the control lock to unlock the meter from the machine through the sequence control mechanism allows the closure lock to be operated through its complete cyle of movement to unlock and relock the closure. However, further operation of the closure lock is prevented by means of the sequence control mechanism until the control lock has been operated through another complete cycle of movement. This mechanism is well shown in Figs. 26, 27, and 30, and will now be described.

Referring specifically to Fig. 30, secured in the periphery of the lock barrel 596 is a pin 638 which is embraced by a notch 639 in a hub 640 of a gear segment 641 supported by the lock barrel 596. The hub 640 has a lug 642 which cooperates with a lug 643 on a sleeve 644. The sleeve 644 has therein a recess the abrupt edges 645 thereof adapted to cooperate with a lug 646 on a hub 647 of a gear 648 loosely mounted on the lock barrel 596. The sleeve 644 fits loosely on the hubs 640 and 647 which are the same in outside diameter. Fast in the frame 318 (Fig. 26) is a stud 649 upon which is rotatably mounted a pawl 650 the tooth of which is urged into engagement with the teeth of the segment 641 by the spring 491. The gear 648 (Figs. 26 and 27) meshes with the gear 479, consequently it is operatively connected to the control lock shaft 456. The parts of the sequence control mechanism are shown in Fig. 30 in the positions they occupy when the closure is locked and the meter is locked in the machine.

Turning the control lock key 476 counterclockwise as viewed in Figs. 26 and 30 to unlock the meter from the machine, through the gears 478 and 479, rotates the gear 648 also in a counterclockwise direction through approximately 180 degrees of movement thereby causing the lug 646 to engage the abrupt edge 645 of the sleeve 644 to rotate said sleeve counterclockwise until the lug 643 is adjacent the lug 642 on the hub 640 of the segment 641. The lug 642 in cooperation with the lug 643 prevents further movement or operation of the control lock until the closure lock 590 (Fig. 27) is operated. The closure lock is now free to be operated through one complete cycle of movement to unlock and relock the closure 582 (Fig. 42). This rotates the lock barrel 596 counterclockwise as viewed in Fig. 30, which by means of the pin 638 rotates the hub 640 and the segment 641 also counterclockwise thereby causing the lug 642 to engage the lug 643 and rotate the sleeve 644 until the abrupt edge 645 of the recess therein is adjacent the lug 646. This makes further movement of the closure lock impossible until the control lock is again operated.

It might be well to state that with the meter locked in the machine and the parts of the sequence control mechanism positioned as shown in Fig. 30 it would be possible to operate the closure lock sufficiently to unlock the closure were it not for the lever 629 (Fig. 29), which when the machine is in its home position blocks the movement of the shaft 603 and consequently blocks the movement of the closure lock barrel 596. However, by partially operating the machine the lever 629 may be rendered ineffective as a means of locking the shaft 603. This is due to the fact that the disk 626 is rocked away from the projection 628 of the lever 629 when the postage totalizer frame is rocked forwardly to engage the postage totalizers with their actuators. This makes it possible for one in possession of the key 597 to the closure lock to rotate the closure lock 180 degrees of movement thereby unlocking the closure and giving access to the wheels of the decreasing totalizer. However, such mal-operation of the closure lock may easily be detected as due to the cooperation of pawl 650 with the segment 641 (Figs. 26 and 30) it is impossible to back up the closure lock and due to the sequence control mechanism it is impossible to turn the closure lock beyond 180 degrees of movement. It is also impossible to complete that particular machine operation as the lever 629 has been rotated clockwise as observed in Fig. 29, thereby in cooperation with the disk 626, blocking return movement of the totalizer frame.

It will be recalled by observing Figs. 29 and 31 that it is impossible to operate the closure lock until the transfer wrench 617 is inserted in the machine and turned to disengage the transfer pawls for the decreasing totalizer and to rotate the peripherial surface 627 of the disk 626 out of the path of the projection 628 of the lever 629. When the closure lock is turned sufficiently to unlock the closure it rotates the sequence control mechanism sufficiently to allow the control lock to be turned 180 degrees to lock the meter in the machine were it possible to properly insert the meter in the machine at this time. However, the fact that the transfer wrench 617 is locked in the meter prevents proper placement of the meter in the machine. It is possible to rotate the hub 352, the segment 373 and the shaft 382, (Figs. 29 and 31) by other means than the wrench 617. For example, a screw driver could be used for this purpose, and as before, unlocking the closure would permit the meter to be inserted and locked in the machine were it not for the fact that the clutch cut in the hub 352 (Fig. 31) is not in alinement with the tenons 353 (Fig. 16). Consequently proper placement of the meter in the machine is again impossible. Neither is it possible at this time to operate the machine in order to aline said tenons with the clutch cut, as it will be recalled that operating the control lock through the mechanism shown in Fig. 47 locks the machine against operation until the meter is properly locked in the machine.

From the foregoing description of the closure lock and the control lock it will be seen that every possible precaution has been taken to make the postage meter fool-proof and tamper-proof. These locking mechanisms make it practically impossible for unscrupulous employees to attempt to mal-operate the machine or to manipulate or tamper with the postage meter without their actions being detected. The sequence control mechanism in addition to assisting as outlined above, also enforces proper operation of the control and closure locks.

From the foregoing explanation it can readily be seen that such a machine as this need not be confined to use as a postage machine but with very little change may be adapted for many other uses without departing from the spirit of this invention.

*Modified form of control lock mechanism*

A modified form of control lock mechanism is illustrated in Figs. 52, 53, and 54. In general, this mechanism operates the same as the mechanism of the preferred form illustrated best in Figs. 50 and 51, the chief difference being in the construction and operation of the control disks in conjunction with the spring plungers.

As in the preferred form, there is a series of cams 655 on the shafts 456 and 441 which operate corresponding plungers 656 which in turn lift and lower spring plungers 657 in accordance with the periphery of the cams 655. However, instead of the control disks having lugs which pass through openings in right-angled extensions of the spring plungers, as is the case in the preferred form, the disks 658 of the modified form have a series of crescent-shaped studs 659 adapted to pass through openings 660 in right-angled extensions of the spring plungers 657 as they are raised and lowered by the cams 655. These crescent-shaped studs 659 also cooperate with recesses 661 in the extensions of the spring plungers 657. The control disks 658 have notches 662 placed in relation to the crescent studs 659 and pawls 663 are adapted to cooperate with these notches to prevent backing up the disks 658. This provides a control lock that is practically pick-proof, and also provides means for detecting any attempt to pick-proof, and also provides means for detecting any attempt to pick the control lock.

Dishonest persons in attempting to operate the control lock by turning the control key 476, and at the same time manipulating the spring plungers 657 so that the crescent-shaped studs will pass through the openings 660 in the extensions of said spring plungers, would in feeling for the openings 660 force one or more of the studs 659 into the recesses 661 in extensions of the spring plungers 657. Simultaneously the pawls 663 engage the notches 662 in the disks 658 thereby preventing further manipulation of the spring plungers 657 by locking them and the shafts 441 and 456 against further movement.

The mechanism just described foils any attempt to mal-operate the control lock and at the same time provides a means for detecting such attempted mal-operation, because in order to back the disks 658 up to disengage the studs 659 from the spring plungers 657 the pawls 663 must be disengaged from the notches in said disks. This requires removal of the meter cabinet or the machine cabinet, as the case may be, and due to the fact that these cabinets are locked and sealed in place this can only be done or accomplished by an authorized repairman.

The above mechanism is a protection against picking the control lock when the meter is attached to the machine, and also prevents picking the part of the control lock contained in the meter and the part contained in the machine when the meter is removed from the machine.

While the forms of mechanisms herein shown and described are admirably adapted to fulfill the objects primarily stated, it is to be understood that it is not intended to confine the invention to the forms of embodiment herein disclosed, for it is susceptible of embodiment in various forms all coming within the scope of the claims which follow.

What is claimed is:

1. In a machine of the class described, the comination of a removable box; a receptacle for the box; a shaft in the box; a shaft in the receptacle; plungers in the box operated by the shaft therein for locking the box in the receptacle; plungers in the receptacle operated by the shaft therein for locking the box in said receptacle; plungers in the receptacle controlled by the plungers in the box; plungers in the box controlled by the plungers in the receptacle; means for coupling the shafts together for synchronous operation when the box is placed in the receptacle; and means whereby the plungers enforce synchronous movement of said shafts.

2. In a machine of the class described, the combination of a removable box; a receptacle for the box; a lock shaft in the box; a lock shaft in the receptacle; means for locking the shafts against movement when the box is removed from the receptacle; means for operatively connecting the shafts for concert movement when the box is inserted in the receptacle; disks on each shaft; and plungers, coacting with the disks on the shafts to enforce concert movement of the shafts when the box is in the receptacle, and to prevent individual movement of said shafts when the box is removed from the receptacle.

3. In a machine of the class described, the combination of a removable box; a receptacle therefor; a shaft in the box; a shaft in the receptacle; cams on each shaft; locking bars to lock the box in the receptacle operated by the cams; shiftable members operated by the locking bars; and elements on each shaft cooperating with the shiftable members to enforce synchronized movement of said shafts.

4. In a machine of the class described, the combination of a removable box; a receptacle for the box; a shaft in the box; a shaft in the receptacle; means for coupling the shafts for concert movement when the box is in the receptacle; cams on each shaft; locking bars for locking the box in the receptacle operated by the cams; shiftable members operated by the locking bars; and elements on the shaft cooperating with the shiftable members for enforcing unitary movement of the shafts when the box is in the receptacle and for preventing individual movement of the shafts when the box is removed from the receptacle.

5. In a machine of the class described the combination of a removable box; a receptacle for the box; means in the box for locking it in the receptacle; means in the receptacle for locking the box therein; a shaft for operating the locking means in the box; a shaft for operating the locking means in the receptacle; means for connecting the shafts for concert movement when the box is in the receptacle; and means operated by both locking means and by both shafts for enforcing concert movement of said shafts, said enforcing means also arranged to block movement of the shafts when the box is removed from the receptacle.

6. In a cash register the combination of a removable box; ways on the cash register to receive the box; a shaft in the box; a shaft in the register; means for connecting the shafts for concert movement when the box is inserted in the ways; means for simultaneously revolving the shafts when the box is inserted in the ways; cams on each of the shafts; locking bars operated by the cams to lock the box in the ways; members operated by the locking bars; disks on each of the shafts; and projections on the disks that cooperate with the members to prevent revolving the shafts when the box is removed from the ways.

7. In a machine of the class described, the combination of a removable box; a closure on the box; a key operated lock for the closure, a receptacle for the box; key operated means to lock the box in the receptacle; and means intermediate the two locking means and jointly operable by the locks to control their sequence of operation to prevent unlocking the closure when the box is in the receptacle, and to prevent locking the box in the receptacle until the closure is locked in closed position.

8. In a cash register, the combination of a removable totalizer unit; ways on the cash register to receive the unit; a key operated means to lock the unit in the ways; a closure giving access to the totalizer; a key operated lock for the closure; and means jointly operable by the unit lock and the closure lock to prevent the operation of the unit lock to lock the unit in the ways until the closure has been locked in closed position by its lock.

9. In a cash register, the combination of a removable totalizer unit; a cabinet for the unit; a closure in the cabinet giving access to the totalizer; a lock for the closure; ways on the cash register to receive the unit; means to lock the unit in the ways; and means to compel unlocking the unit from the ways before the closure can be unlocked, said compelling means also enforcing the locking of the closure before the unit can again be locked in the ways.

10. In a cash register, the combination of a removable totalizer; a closure giving access to the totalizers; a lock for the closure; transfer mechanism for the totalizer normally engaged therewith; means to disengage the transfer mechanism from the totalizer; and means intermediate the transfer mechanism and the closure lock to release the closure lock when the transfer mechanism is disengaged.

11. In a machine of the class described, the combination of a removable totalizer; a receptacle for the totalizer; a closure giving access to the totalizer; a lock for the closure; transfer mechanism for the totalizer; means operable when the totalizer is removed from the receptacle to disable the transfer mechanism; and means to release the closure lock when the transfer mechanism is disabled.

12. In a machine of the class described the combination of a removable totalizer unit; a receptacle for the unit; a closure in the unit giving access to the totalizer; a lock for the closure; transfer means for the totalizer; means including a disk operable when the unit is removed from the receptacle to disable the transfer means; and a lever cooperating with the disk and the closure lock to prevent operation of the closure lock when the transfer means is not disabled and to prevent enabling the transfer means when the closure is unlocked.

13. In a cash register, the combination of a removable totalizer unit; ways on the register to receive the unit; a closure in the unit giving access to the totalizer; a lock for the closure; transfer means for the totalizer normally engaging said totalizer; means including a disk operable when the unit is removed from the ways to disengage the transfer means from the totalizer; a member operatively connected to the closure lock; and means intermediate the disk and the member to prevent unlocking the closure when the unit is inserted in the ways, and to prevent reengaging the transfer means when the closure is unlocked.

14. In a machine of the class described, the combination of a removable totalizer unit; a receptacle for the unit; a closure giving access to the totalizer; a lock for the closure; transfer means for the totalizer normally engaged therewith; means to disengage the transfer means from the totalizer when the unit is removed from the receptacle; and means to prevent reengaging the transfer means with the totalizer when the closure is unlocked.

15. In a machine of the class described, the combination of a removable totalizer; transfer devices for normally locking the totalizer; a closure giving access to the totalizer; a lock for the closure; and means operated by the closure lock to unlock the transfer devices when unlocking the closure and to restore the transfer devices to locking position when locking the closure.

16. In a machine of the class described, the combination of a removable totalizer; a plurality of tripable transfer pawls for the totalizer; a closure giving access to the totalizer for the purpose of setting same; a lock for the closure; and means operated by the locking movement of the closure lock to restore all tripped transfer pawls.

17. In a machine of the class described, the combination of a removable totalizer; a plurality of tripable transfer pawls for the totalizer; a closure giving access to the totalizer for the purpose of setting same; a lock for the closure; a shaft operatively connected to the lock; and a member on the shaft adapted to restore all tripped transfer pawls upon movement of the closure lock to locking position.

18. In a machine of the class described the combination of a removable unit; a receptacle for the unit; means including a shaft in the unit and a shaft in the receptacle to lock the unit in the receptacle; means to connect the shafts for concert movement when the unit is in the receptacle; members on each shaft; projections on the members; and elements controlled by movement of the shafts said elements having recesses therein that cooperate with the projections to prevent manipulation of the shafts when the unit is removed from the machine.

19. In a cash register the combination of a removable unit; a receptacle for the unit; means including a shaft in the unit to lock the unit in the receptacle; disks on the shaft; projections on the disks; members having openings through which the projections pass; means to synchronize movement of the disks and members when the unit is in the receptacle so that the projections pass through the openings; recesses in the members to receive the projections to lock the shaft and members against forward movement upon attempted manipulation of the shaft when the unit is removed from the machine; and means to prevent retrograde movement of the disks.

20. In a machine of the class described the combination of a removable box having openings therein; a receptacle for the box having openings that match the openings in the box; means including a shaft in the box and a shaft in the receptacle to lock the box in the receptacle; a closure for the openings in the box; a closure for the openings in the receptacle; and means operated by the shafts for closing the closures when the box is unlocked from the machine and for opening the closures when the box is locked in the machine.

21. In a machine of the class described the combination of a removable box having apertures therein; a receptacle for the box having apertures that match the apertures in the box; means including a shaft in the box and a shaft in the receptacle to lock the box in the receptacle; a closure for the apertures in the box; a closure for the apertures in the receptacle; and elements intermediate the shafts and the closures and operated by said shafts to shut the closures when the box is unlocked from the receptacle and to open the closures when the box is locked in the receptacle.

22. In a machine of the class described, the combination of a removable box; a receptacle for the box; a closure on the box; a key operated lock for the closure; key operated means to lock the box in the receptacle; and sequence control mechanism cooperable with the two locking means whereby the locking means for the box cannot be operated to lock the box in the receptacle until it has been released by the operation of the closure lock.

23. In a machine of the class described, the combination of a removable box; a receptacle for the box; a closure on the box; a key operated lock for the closure; key operated means to lock the box in the receptacle; means to prevent the operation of the locking means to lock the box in the receptacle; and means whereby the preventing means is rendered ineffective by the closure lock when it is operated.

WILLIAM H. ROBERTSON.